(12) United States Patent
Inoue et al.

(10) Patent No.: US 8,575,876 B2
(45) Date of Patent: Nov. 5, 2013

(54) OPTICAL ENTIRE-CIRCUMFERENCE ENCODER AND MOTOR SYSTEM

(75) Inventors: Sadatoshi Inoue, Fukuoka (JP); Jiro Muraoka, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 351 days.

(21) Appl. No.: 13/047,821

(22) Filed: Mar. 15, 2011

(65) Prior Publication Data

US 2011/0227518 A1 Sep. 22, 2011

(30) Foreign Application Priority Data

Mar. 19, 2010 (JP) ................................ P.2010-065081

(51) Int. Cl.
*H02K 29/10* (2006.01)
(52) U.S. Cl.
USPC .................. 318/400.4; 318/640; 318/602
(58) Field of Classification Search
USPC ........... 318/400.4, 640, 602, 280; 250/231.13
See application file for complete search history.

(56) References Cited

U.S. PATENT DOCUMENTS

| 7,348,543 | B2 | 3/2008 | Villaret |
| 8,124,928 | B2 | 2/2012 | Villaret |
| 2007/0272840 | A1* | 11/2007 | Musha et al. ............ 250/231.13 |

FOREIGN PATENT DOCUMENTS

| CN | 101553712 | 10/2009 |
| JP | 58-172235 U | 11/1983 |
| JP | 2006-515426 | 5/2006 |
| JP | 2007-064818 | 3/2007 |
| JP | 2010-500554 | 1/2010 |
| WO | WO 2004/063671 A3 | 7/2004 |
| WO | WO 2008/018059 | 2/2008 |

OTHER PUBLICATIONS

Japanese Office Action for corresponding JP Application No. 2010-065081, Jun. 12, 2012.
Chinese Office Action for corresponding CN Application No. 201110061197.6, Apr. 17, 2013.

* cited by examiner

*Primary Examiner* — Karen Masih
(74) *Attorney, Agent, or Firm* — Ditthavong Mori & Steiner, P.C.

(57) ABSTRACT

An optical entire-circumference encoder includes a plurality of rotation slits provided to transmit light at an equal pitch radially around a rotation axis as a center in a rotation track. A plurality of fixed slits is provided to transmit light at an equal pitch in a plurality of regions radially around the rotation axis as the center in a fixed track. A plurality of light receivers is disposed in a vicinity of the rotation axis to receive a light guided by the light guide in the regions respectively. The fixed slits in one of the regions and the fixed slits in another region adjacent to the one of the regions among the regions in the fixed track are formed so that a phase difference by which a rotation direction of the rotor is determined occurs between light reception signals of the plurality of light receivers.

20 Claims, 13 Drawing Sheets

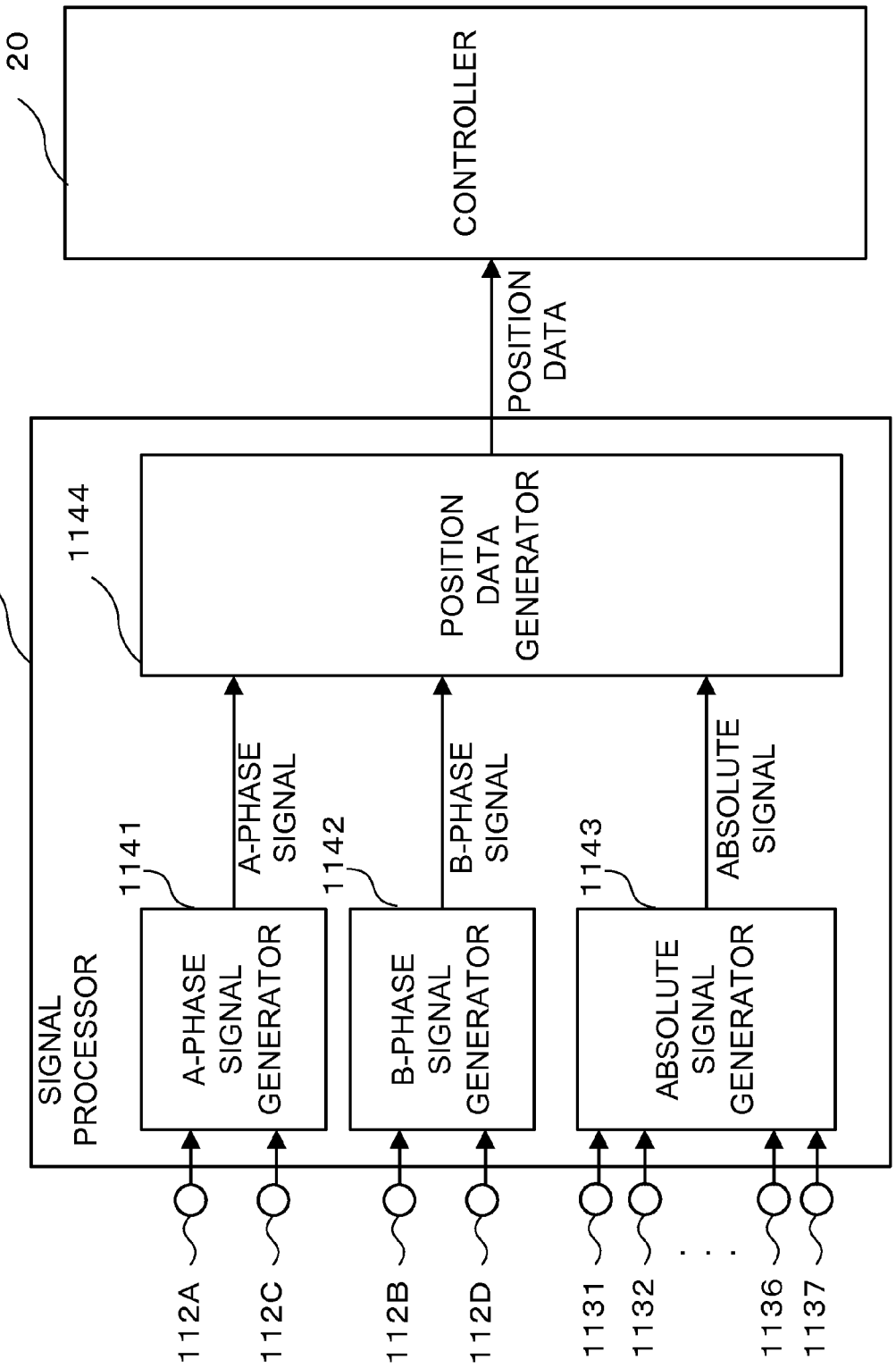

OPTICAL ENTIRE-CIRCUMFERENCE ENCODER AND MOTOR SYSTEM

CROSS-REFERENCE TO RELATED APPLICATIONS

The present application claims priority under 35 U.S.C. §119 to Japanese Patent Application No. 2010-065081, filed Mar. 19, 2010. The contents of this application are incorporated herein by reference in their entirety.

BACKGROUND OF THE INVENTION

1. Field of the Invention

The present invention relates to an optical entire-circumference encoder and a motor system.

2. Description of the Related Art

To measure physical amounts such as the position, velocity, and the like of a mobile body, an encoder is used.

The encoder is roughly divided into mainly a rotary type (hereinbelow, also simply called "rotary encoder") and a linear type (hereinbelow, also simply called "linear encoder") in accordance with the movement direction of a mobile body.

A rotary motor (hereinbelow, also simply called "motor") using a rotary encoder (hereinbelow, also simply called "encoder") is often subjected to position control based on a rotation position or the like detected by the encoder. The precision or the like of such position control is largely influenced by the precision of the encoder. Therefore, in devices and the like which are becoming more precise, a higher-precision encoder is being developed for higher-precision position control.

Particularly, an optical encoder among encoders roughly divided to various kinds in accordance with detection principles can realize higher-precision position detection as compared with the encoders using other detection principles such as the magnetic type. A main optical encoder irradiates slits formed in a disc connected to a rotor (an example of a mobile body) with light and receives reflection light or transmission light from the slits. As a result, the optical encoder detects a position based on the reflection light or transmission light repeated in accordance with the rotation of the disc. Therefore, the optical encoder can realize very high position detection precision in accordance with the precision of forming the slits.

In such an optical encoder, to generate reflection light or transmission light corresponding to rotation of a disc, fixed slits corresponding to rotation slits formed in the disc are often used. Specifically, the optical encoder is constructed so that, when a rotation slit reaches a predetermined position with respect to a fixed slit in accordance with rotation of a disc, reflection light or transmission light reaches a light receiving element. Therefore, the light receiving element receives a signal according to the rotation of the disc and generates position information from the light reception signal. Thus, in the optical encoder, to perform high-precision position detection, a positional relation between the rotation slits and fixed slits has to be adjusted with high precision for the following reason. In the case where there is an error in the positional relation between the fixed slits and the rotation slits, noise increases due to reception of reflection light and transmission light which is not desired in designing by the light receiving element by the amount of the error.

To reduce such noise, a rotary encoder of an optical entire-circumference correction type (hereinbelow, also called "optical entire-circumference encoder") has been developed (refer to, for example, Japanese Unexamined Patent Application Publication (Translation of PCT Application) No. 2006-515426). The optical entire-circumference encoder irradiates almost all of a plurality of slits formed in the entire circumference of a disc with light and receives the reflection light or transmission light. Therefore, even in the case where an error occurs in the positional relation between a fixed disc and a rotating disc such as a case where a disc is attached eccentrically, by using reflection light or transmission light obtained from the entire circumference, the error can be cancelled out. Therefore, the resistance to such an error is increased as described above and, as a result, manufacture of the optical entire-circumference encoder can be facilitated.

On the other hand, although not limited to an optical encoder, to detect the rotation direction of a disc, two or more periodical light reception signals whose phases are different from each other by, for example, 90 degrees in electric angle have to be obtained. The two light reception signals whose phases are different from each other will be also called an A-phase signal and a B-phase signal.

To generate such an A-phase signal and a B-phase signal, in the optical entire-circumference encoder, as described in Japanese Unexamined Patent Application Publication (Translation of PCT Application) No. 2006-515426, at least one of the rotation slits and the fixed slits formed in the entire circumference around the rotary shaft is formed by double slits whose phases are different from each other by 90° and which are arranged in the radial direction. An optical path or the like is doubled in the radial direction or the height direction (thrust direction) so as to obtain different signals every doubled slits. The optical path and the like doubled in the radial direction or the height direction is a cause of enlarging the size of the entire apparatus.

SUMMARY OF THE INVENTION

According to one aspect of the present invention, an optical entire-circumference encoder includes a rotation track, a plurality of rotation slits, a fixed track, a plurality of fixed slits, a light guide, and a plurality of light receivers. The rotation track is rotatable to follow a rotor rotatable around a rotation axis. The rotation track is provided to be in a ring shape around the rotation axis as a center. The plurality of rotation slits is provided to transmit light at an equal pitch radially around the rotation axis as the center in the rotation track. The fixed track is fixedly set in a ring shape in correspondence with the rotation track on one side of the rotation track. The fixed track is divided into a plurality of regions in a circumferential direction of the fixed track. The plurality of fixed slits is provided to transmit light at an equal pitch in the plurality of regions radially around the rotation axis as the center in the fixed track. The light guide is provided to guide light which passed through the plurality of fixed slits and the plurality of rotation slits toward a vicinity of the rotation axis while condensing the light. The plurality of light receivers is disposed in the vicinity of the rotation axis to receive the light guided by the light guide in the plurality of regions respectively. The plurality of fixed slits in one of the plurality of regions and the plurality of fixed slits in another region adjacent to the one of the plurality of regions among the plurality of regions in the fixed track are formed so that a phase difference by which a rotation direction of the rotor is determined occurs between light reception signals of the plurality of light receivers.

According to another aspect of the present invention, a motor system includes a motor device, an optical entire-circumference encoder, and a controller. The motor device is configured to rotate a rotary shaft. The optical entire-circumference encoder is coupled to the rotary shaft and is configured to measure position of the rotary shaft. The optical entire-circumference encoder includes a rotation track, a plurality of rotation slits, a fixed track, a plurality of fixed slits, a light guide, and a plurality of light receivers. The rotation track is rotatable to follow a rotor rotatable around a rotation axis. The rotation track is provided to be in a ring shape around the rotation axis as a center. The plurality of rotation slits is provided to transmit light at an equal pitch radially around the rotation axis as the center in the rotation track. The fixed track is fixedly set in a ring shape in correspondence with the rotation track on one side of the rotation track. The fixed track is divided into a plurality of regions in a circumferential direction of the fixed track. The plurality of fixed slits is provided to transmit light at an equal pitch in the plurality of regions radially around the rotation axis as the center in the fixed track. The light guide is provided to guide light which passed through the plurality of fixed slits and the plurality of rotation slits toward a vicinity of the rotation axis while condensing the light. The plurality of light receivers is disposed in the vicinity of the rotation axis to receive the light guided by the light guide in the plurality of regions respectively. The plurality of fixed slits in one of the plurality of regions and the plurality of fixed slits in another region adjacent to the one of the plurality of regions among the plurality of regions in the fixed track are formed so that a phase difference by which a rotation direction of the rotor is determined occurs between light reception signals of the plurality of light receivers. The controller is configured to control rotation of the motor device based on the position measured by the optical entire-circumference encoder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13 is a diagram for explaining the configuration of a signal processor according to the embodiment.

DESCRIPTION OF THE EMBODIMENTS

Figure 1:
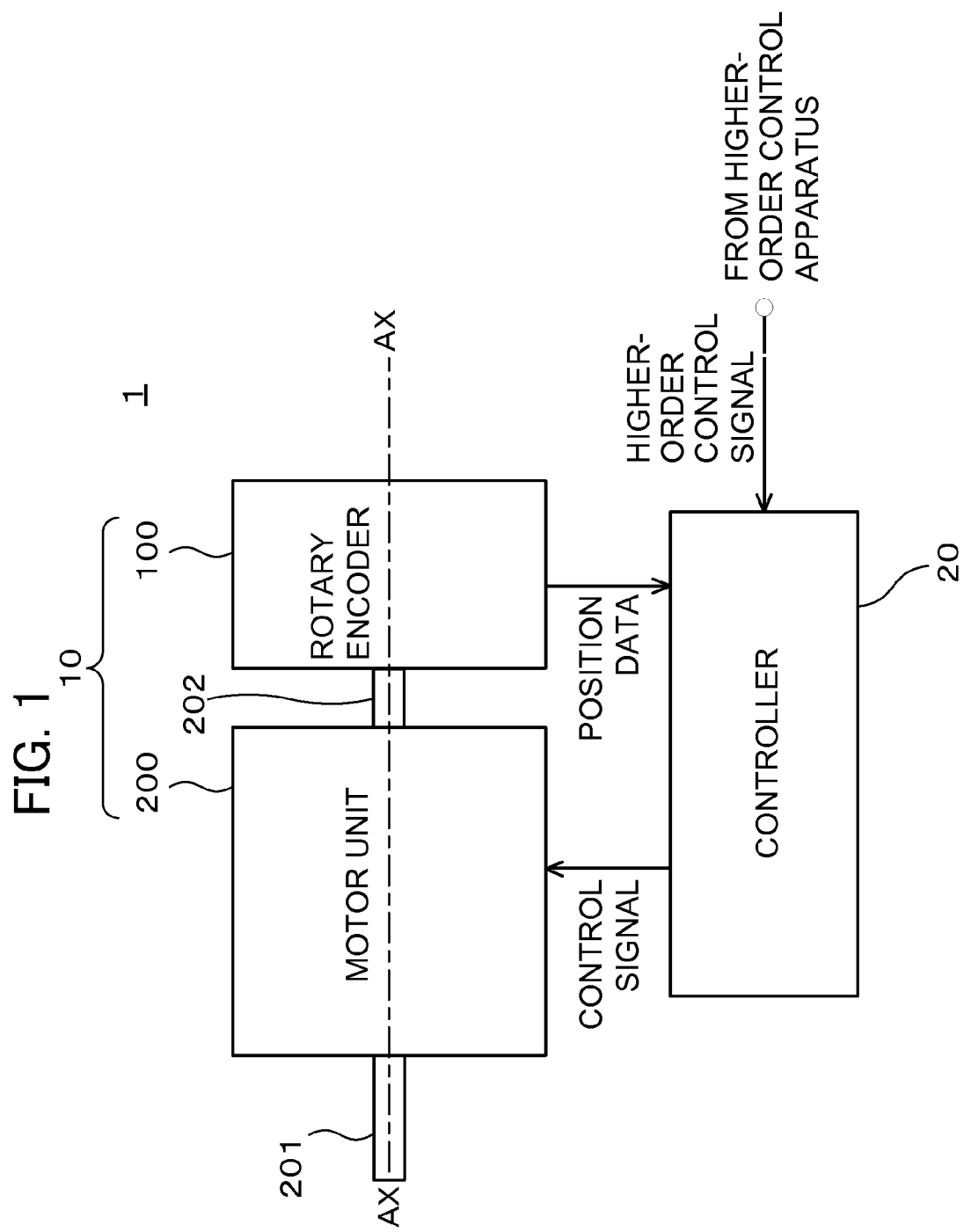
FIG. 1 is a diagram for explaining the configuration of a motor system according to a first embodiment of the invention.

Hereinafter, the embodiments of the present invention will be described in detail with reference to the appended drawings, wherein like reference numerals designate corresponding or identical elements throughout the various drawings.

In each of the embodiments of the invention to be described below, a rotary motor system having an optical encoder of a rotary type will be described as an example. The optical entire-circumference encoder according to the embodiments is applied to a rotary motor system (hereinbelow, also called "motor system") and measures position data including the rotation angle (also called "position") of the shaft (an example of a rotor) of a motor of the motor system. However, obviously, an optical entire-circumference encoder according to any of the embodiments to be described below can be applied to various rotors rotating about a predetermined rotation axis such as a prime mover or a steering.

The embodiments of the present invention will be described in the following order for easier understanding.

1 First Embodiment
  1-1 Motor System according to First Embodiment
  1-2 Configuration of Encoder according to First Embodiment
  1-3 Operation of Encoder according to First Embodiment
  1-4 Example of Effect produced by First Embodiment
1 First Embodiment
1-1 Rotary Motor System According to First Embodiment First, with reference to FIG. 1, the configuration of a motor system according to the first embodiment of the present invention will be described. FIG. 1 is a diagram for explaining the configuration of a motor system according to the first embodiment of the invention.

As shown in FIG. 1, a motor system 1 according to the embodiment has a motor 10 and a controller 20. The motor 10 has an optical entire-circumference encoder (hereinbelow, also simply called "encoder") 100 and a motor unit 200.

The motor unit 200 is an example of a power generation source which does not include the encoder 100. The motor unit 200 maybe also simply called a motor. The motor unit 200 has, at least on one side, a rotary shaft 201 and outputs rotational force by making the rotary shaft 201 rotate about a rotation axis AX.

The motor unit 200 is not limited as long as it is a servo motor which is controlled based on position data. The motor unit 200 is not limited to an electric motor using electricity as a power source but may be a motor unit using another power source such as a hydraulic motor unit, an air motor unit, or a steam motor unit. For convenience of explanation, the case where the motor unit 200 is an electric motor unit will be described below.

The encoder 100 is disposed on a side opposite to the rotary shaft 201 of the motor unit 200, and is coupled to another rotary shaft 202 rotating in correspondence with the rotary shaft 201. The encoder 100 detects the position data of the rotary shaft 202. That is, the encoder 100 detects the position data of the rotary shaft 201 (an example of the rotor) from which a rotational force is outputted.

The position data detected by the encoder 100 according to the embodiment will be described below on assumption that it includes the position of the rotary shaft 201 or the like (rotation angle, also called "motor position" or the like below) and speed including the rotation direction of the rotary shaft 201 or the like (rotation speed, also called "motor speed" or the like below). The encoder 100 according to the embodiment may detect only the rotation direction in place of the motor speed and may also detect acceleration of the rotary shaft 201 or the like (angular acceleration, hereinbelow, also called "motor acceleration" or the like).

The disposing position of the encoder 100 is not limited. For example, the encoder 100 may be disposed so as to be directly coupled to the rotary shaft 201 or may be coupled to a rotor such as the rotary shaft 201 via another mechanism such as a reducer or a rotation direction converter.

The controller 20 obtains position data outputted from the encoder 100 and, based on the position data, controls rotation of the motor unit 200. Therefore, in the embodiment in which an electric motor is used as the motor unit 200, the controller 20 controls the rotation of the motor unit 200 by controlling current, voltage, or the like applied to the motor unit 200 based on the position data. Further, the controller 20 can also control the motor unit 200 so as to obtain a higher-order control signal from a higher-order control apparatus (not shown) and output a position, a velocity, or the like expressed by the higher-order control signal from the rotary shaft 201 of the motor unit 200. In the case where the motor unit 200 uses different power sources such as a hydraulic power source, an air power source, and a steam power source, by controlling supply of these power sources, the controller 20 can control the rotation of the motor unit 200.

1-2 Configuration of Encoder According to First Embodiment

Figure 2:
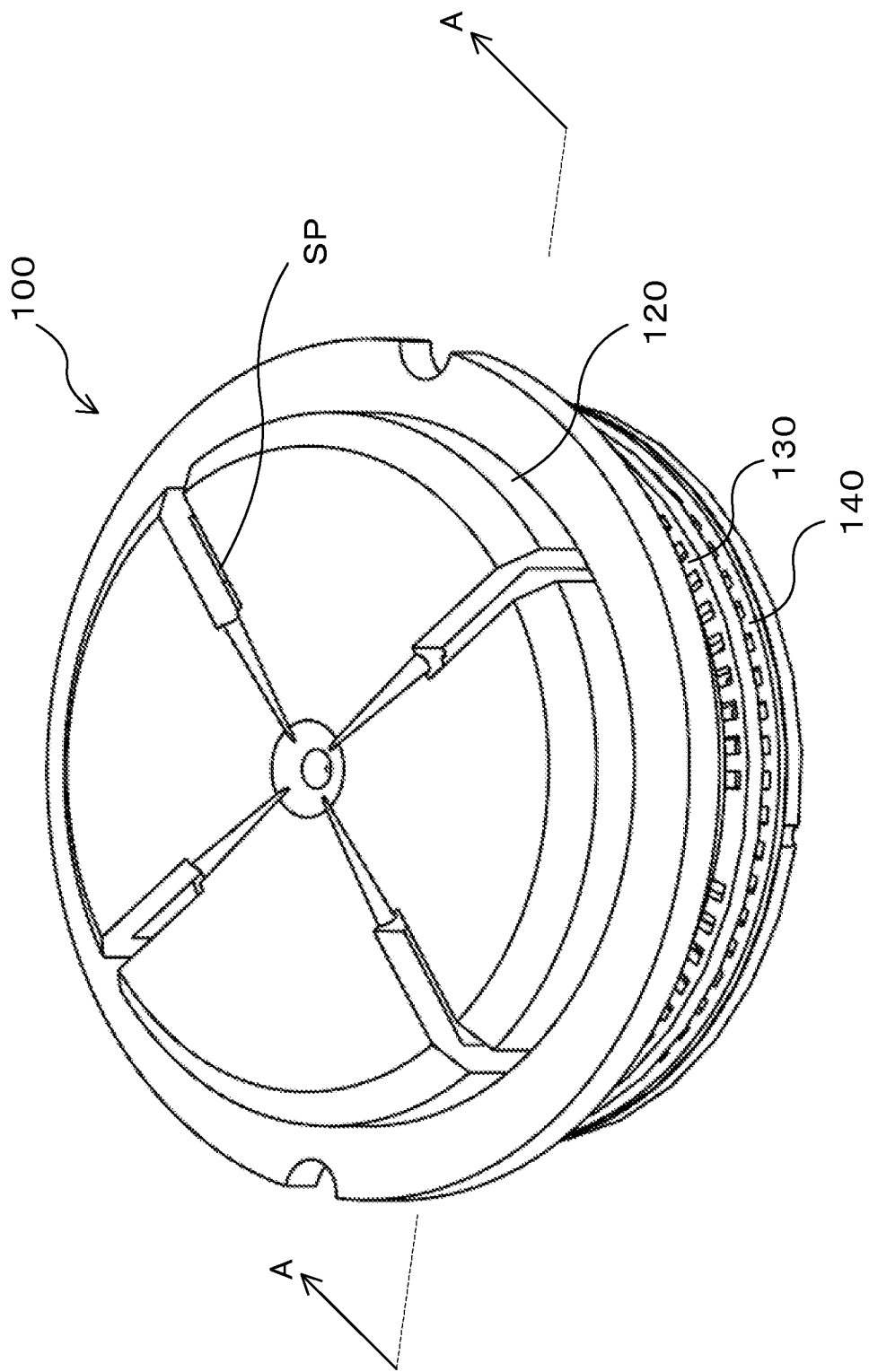
FIG. 2 is a diagram for explaining the configuration of an encoder according to the embodiment.
Figure 3:
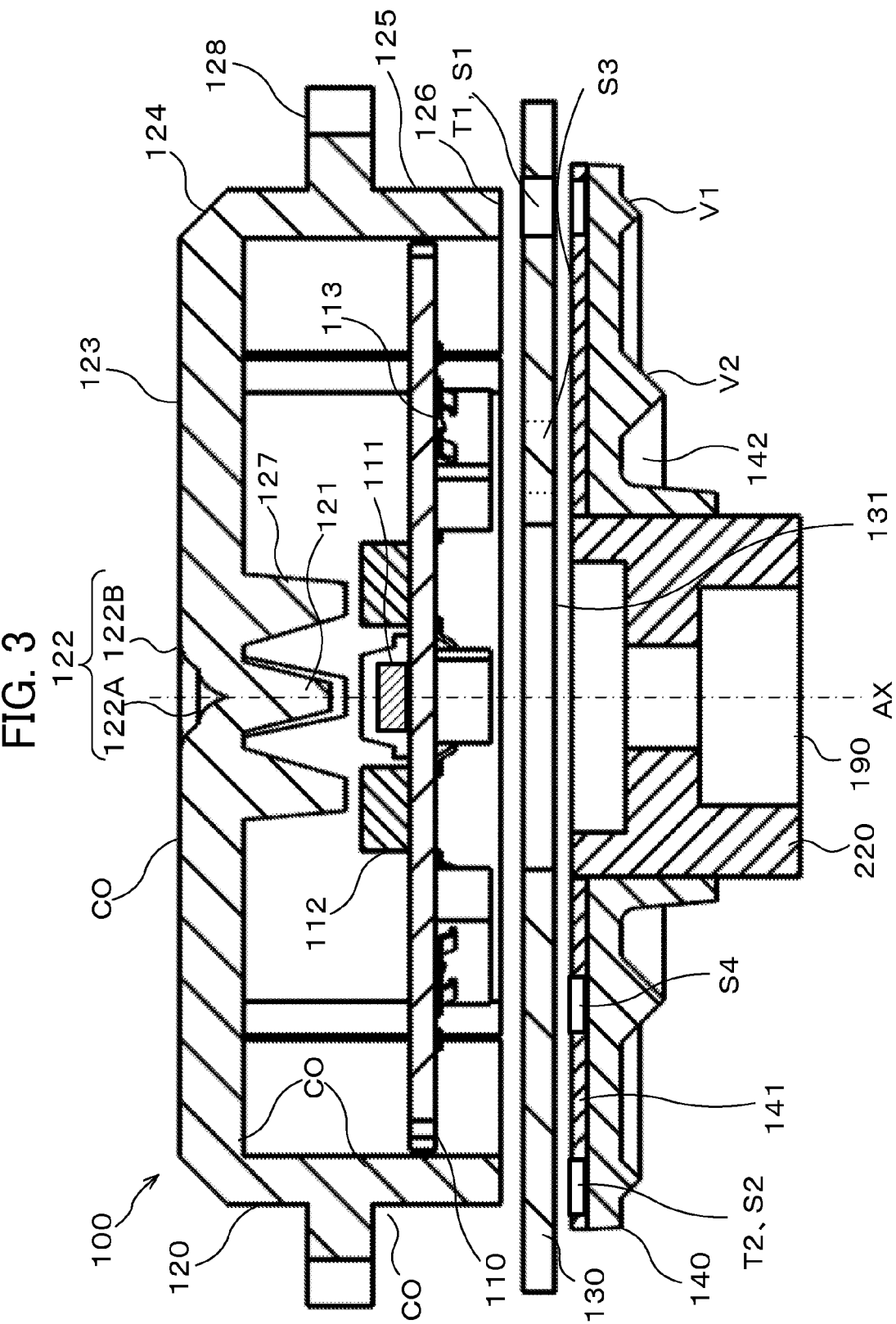
FIG. 3 is a diagram for explaining the configuration of the encoder according to the embodiment.

Next, with reference to FIGS. 2 and 3, the configuration of the encoder 100 according to the embodiment will be described. FIGS. 2 and 3 are diagrams for explaining the configuration of the optical entire-circumference encoder according to the embodiment. FIG. 2 is a diagram when the configuration of a part of the encoder 100 according to the embodiment is viewed obliquely from above, and FIG. 3 is a cross section of the encoder 100 taken along line A-A of FIG. 2.

As shown in FIGS. 2 and 3, the encoder 100 according to the embodiment has, roughly, a substrate 110, a light guiding unit 120, a mask 130, and a disc 140. In the following, the configurations will be described by properly referring to the drawings and, after that, the flow of light, detection principles, and the like will be described through the operation of the encoder 100. In the following, for convenience of explanation, a side of the motor unit 200 in the rotation axis AX will be also called "lower side" or "bottom", a direction apart from the motor unit 200 will be also called "upper side" or "top", and a direction perpendicular to the rotation axis AX will be also called a "lateral direction" or "radial direction". Obviously, the encoder 100 according to the embodiment is not limited to the concepts of the posture in the vertical direction but may be disposed in any posture.

Substrate 110

Figure 4:
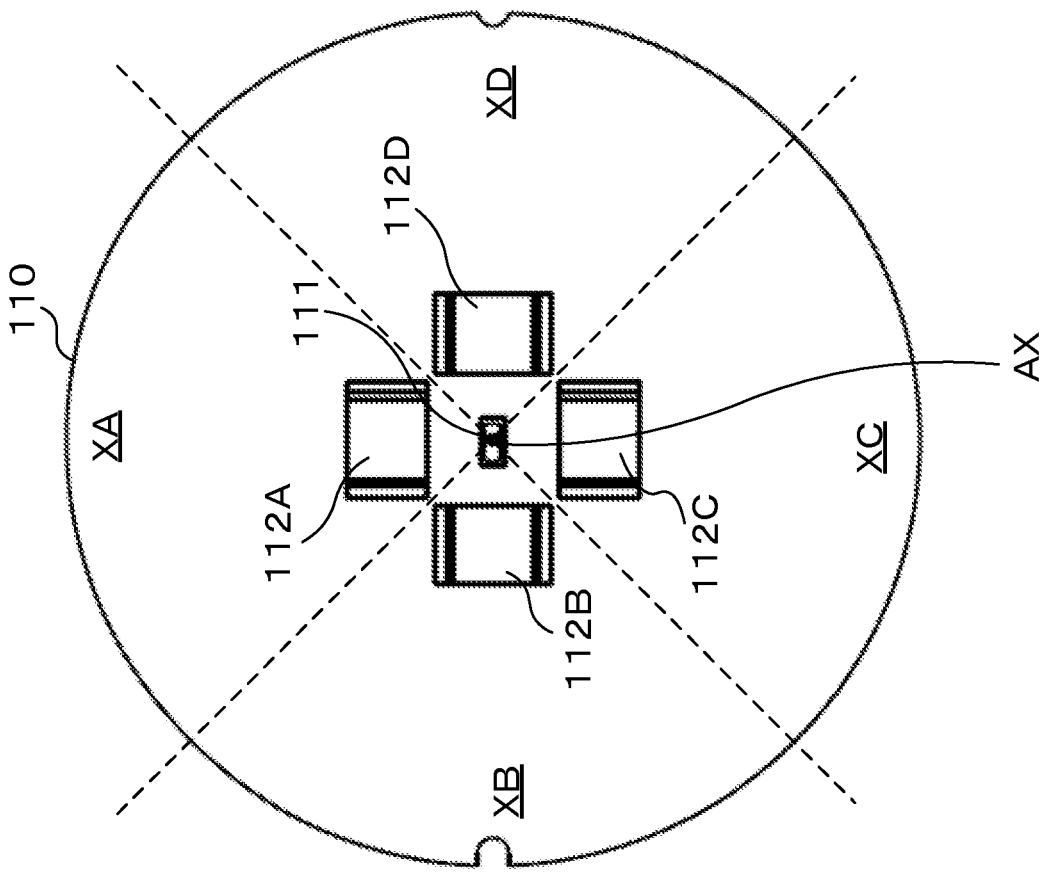
FIG. 4 is a diagram for explaining the configuration of a substrate according to the embodiment.
Figure 5:
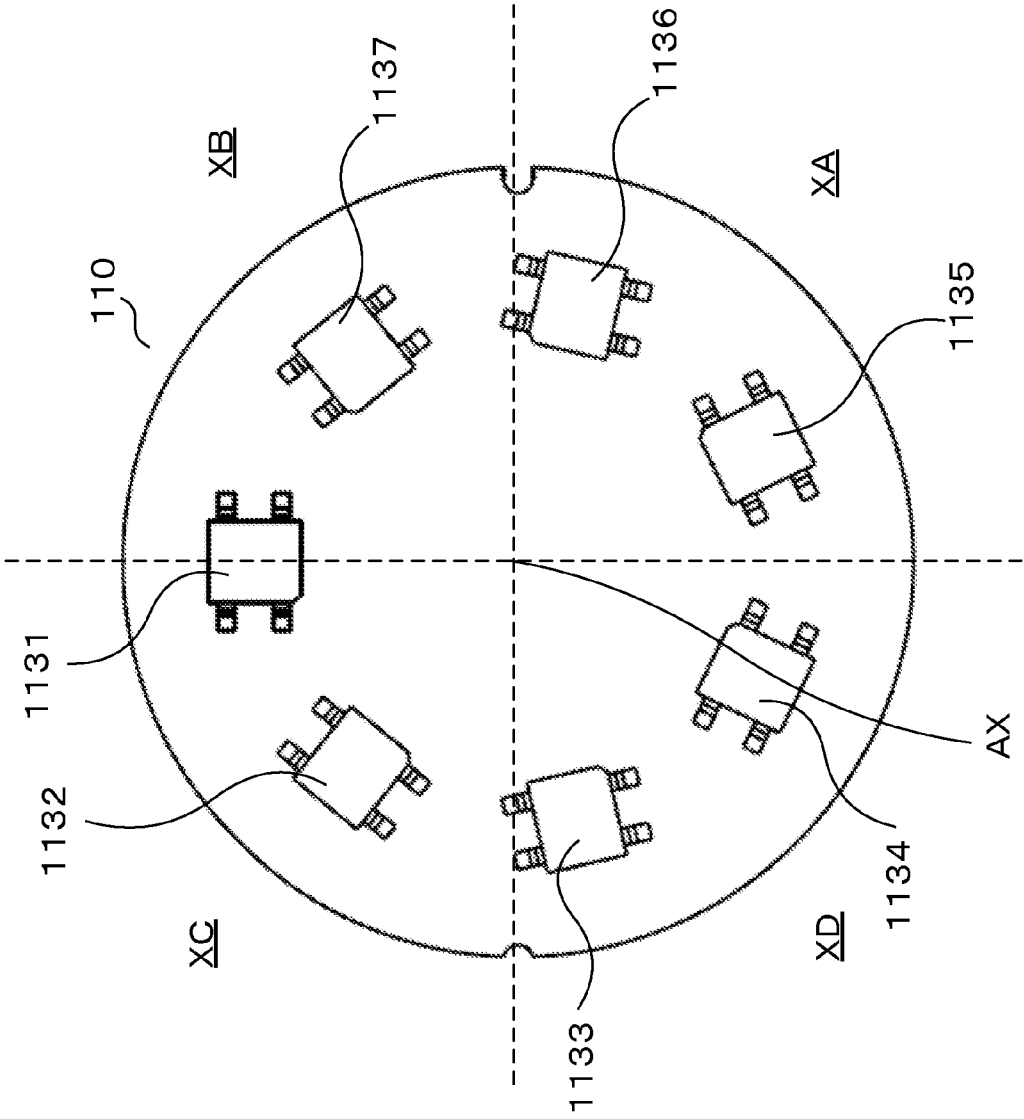
FIG. 5 is a diagram for explaining the configuration of the substrate according to the embodiment.

As shown in FIG. 3, the substrate 110 has a light emitter 111, a light receiver 112, an absolute detector 113, and a signal processor 114 (refer to FIG. 13). The substrate 110 is disposed above the mask 130 (an example of a side opposite to a rotation track in a fixed track). The configuration of the substrate 110 is shown in FIGS. 4 and 5. FIGS. 4 and 5 are diagrams for explaining the configuration of the substrate according to the embodiment. FIG. 4 is a diagram showing a top face of the substrate 110, and FIG. 5 is a diagram showing a bottom face of the substrate 110.

The light emitter 111 is disposed on the rotation axis AX in the top face of the substrate 110 as shown in FIG. 4. The light emitter 111 emits light upward along the rotation axis AX. The light emitted from the light emitter 111 may be various light such as a laser beam, parallel light, diverging light, converging light, and the like, and wavelength of the light is not also limited.

The light receiver 112 is an example of two or more light receivers and is constructed by four light receivers 112A to 112D in the embodiment as shown in FIG. 4. The light receivers 112A, 112B, 112C, and 112D are disposed in four regions XA, XB, XC, and XD, respectively, in a vicinity of the rotation axis AX so as to surround the light emitter 111 in the top face of the substrate 110. In the embodiment, the four regions XA to XD are set point-symmetrically around the rotation axis AX, so that the light receivers 112A to 112D are disposed point-symmetrically around the rotation axis AX. The light receivers 112A, 112B, 112C, and 112D receive light in the regions XA, XB, XC, and XD, respectively, and generate light reception signals. That is, in the embodiment, four reception signals are generated from the regions XA, XB, XC, and XD.

In the embodiment, as will be described later, the mask 130 is divided in the four regions XA to XD which are point-symmetrical around the rotation axis AX. Therefore, four light receivers 112A to 112D and four configurations which will be described later are disposed. It is sufficient that two or more regions may be set in the mask 130 and the positions of setting the regions may not be point symmetrical. In this case, it is desirable to dispose the light receivers 112 and the other configurations in accordance with the number of regions and the setting positions of the regions. In the case where the number of regions is an integral multiple of four, the encoder 100 according to the embodiment can further enhance the effect of reducing the influence on eccentricity. In the case where the regions are formed point-symmetrically, such resistance to eccentricity can be further increased.

On the other hand, the absolute detector 113 is constructed by seven absolute detectors 1131 to 1137. As shown in FIG. 5, the absolute detectors 1131 to 1137 are disposed point-symmetrically in positions apart from the rotation axis AX in the under face of the substrate 110. As the absolute detectors 1131 to 1137, for example, light emission/reception integrated elements can be used. The absolute detectors 1131 to 1137 emit light to the lower side (the disc 140) and receive light which comes from the lower side. As a result, the absolute detectors 1131 to 1137 generate light reception signals. The light reception signal generated by the absolute detectors 1131 to 1137 includes information of an absolute position and is used for calculation of a motor position which will be described later. Therefore, the number of the absolute detectors 113 and the disposing positions are not limited to those in the embodiment as long as the absolute value of the motor position can be detected.

Although not shown in FIGS. 4 and 5, the signal processor 114 is disposed in the substrate 110. The signal processor 114 obtains the light reception signals from the light receiver 112 and the absolute detector 113 and generates position data including the motor position (including the absolute value) and the motor speed (including the rotation direction) from the plurality of light reception signals. The generated position data is transmitted to the controller 20. The signal processor 114, including its configuration, will be described in the operation of the encoder 100 (refer to FIG. 13). Different from the embodiment, the signal processor 114 may be disposed in the configuration of the encoder 100 or the controller 20, not in the substrate 110, and may have a configuration different from the encoder 100 and the controller 20.

Light Guiding Unit 120

The light guiding unit 120 is made of a material which transmits light such as, mainly, for example, glass material or plastic material, and is formed to extend on the rotation axis AX toward the mask 130 so as to sandwich the substrate 110 between the light guiding unit 120 and the mask 130 (fixed track T1) and cover upper and side parts of the substrate 110. The light guiding unit 120 guides light emitted from the light emitter 111 while diverging the light to sides and, after that, guides the light downward, thereby irradiating almost the entire circumference of the fixed track T1 in the mask 130 with the light. In addition, the light guiding unit 120 guides the light passed through almost the entire circumference of a plurality of fixed slits and a plurality of rotation slits which will be described later toward a vicinity of the rotation axis AX while condensing the light by an optical path similar to that used at the time of the irradiation and irradiates the light receiver 112 with the light. In the flow of light, a course of irradiating the mask 130 with light will be also called an "outward path", and a course of irradiating the light receiver 112 with the return light from the mask 130 or the like will be also called a "return path".

Figure 6:
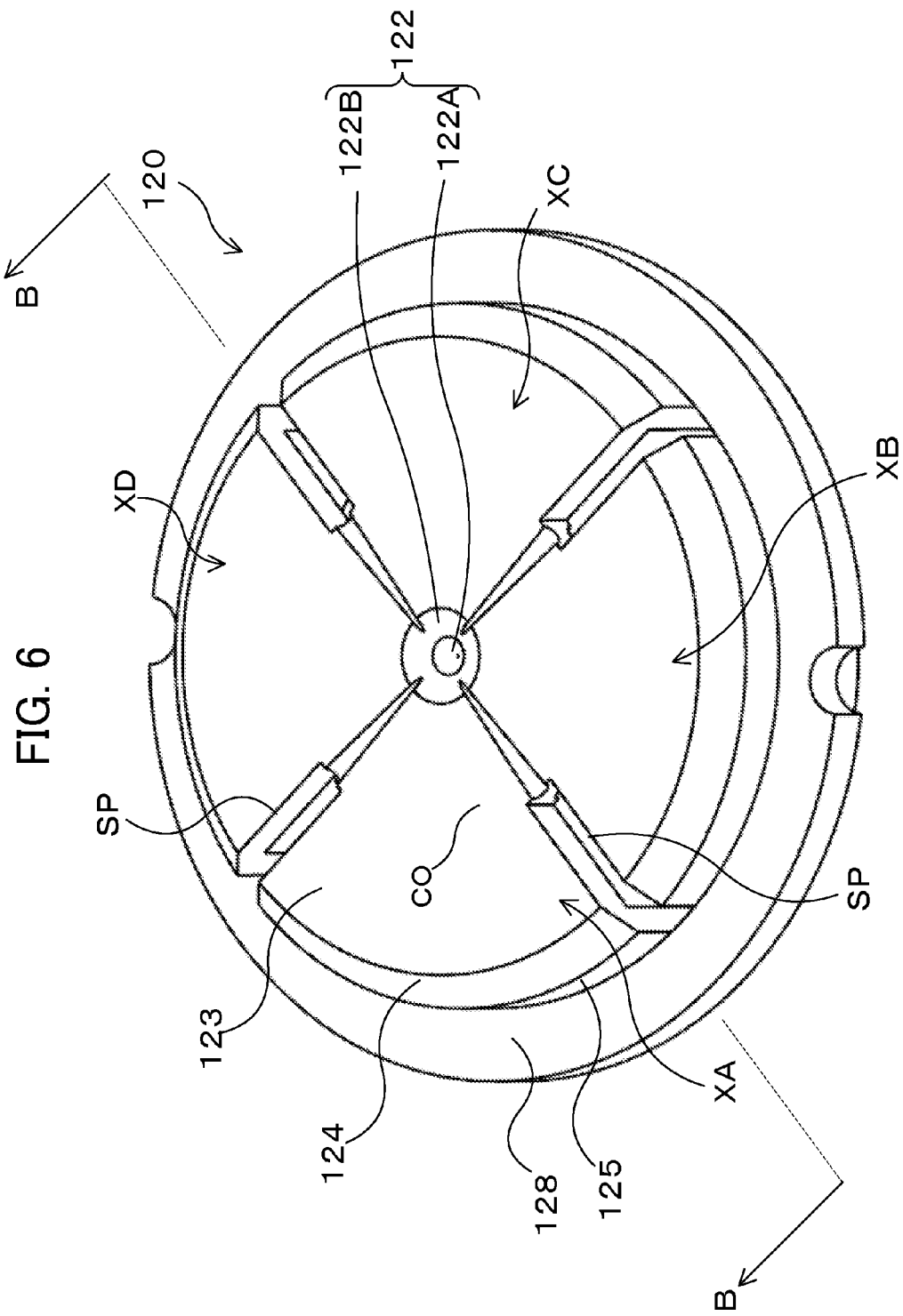
FIG. 6 is a diagram for explaining the configuration of a light guiding unit according to the embodiment.
Figure 7:
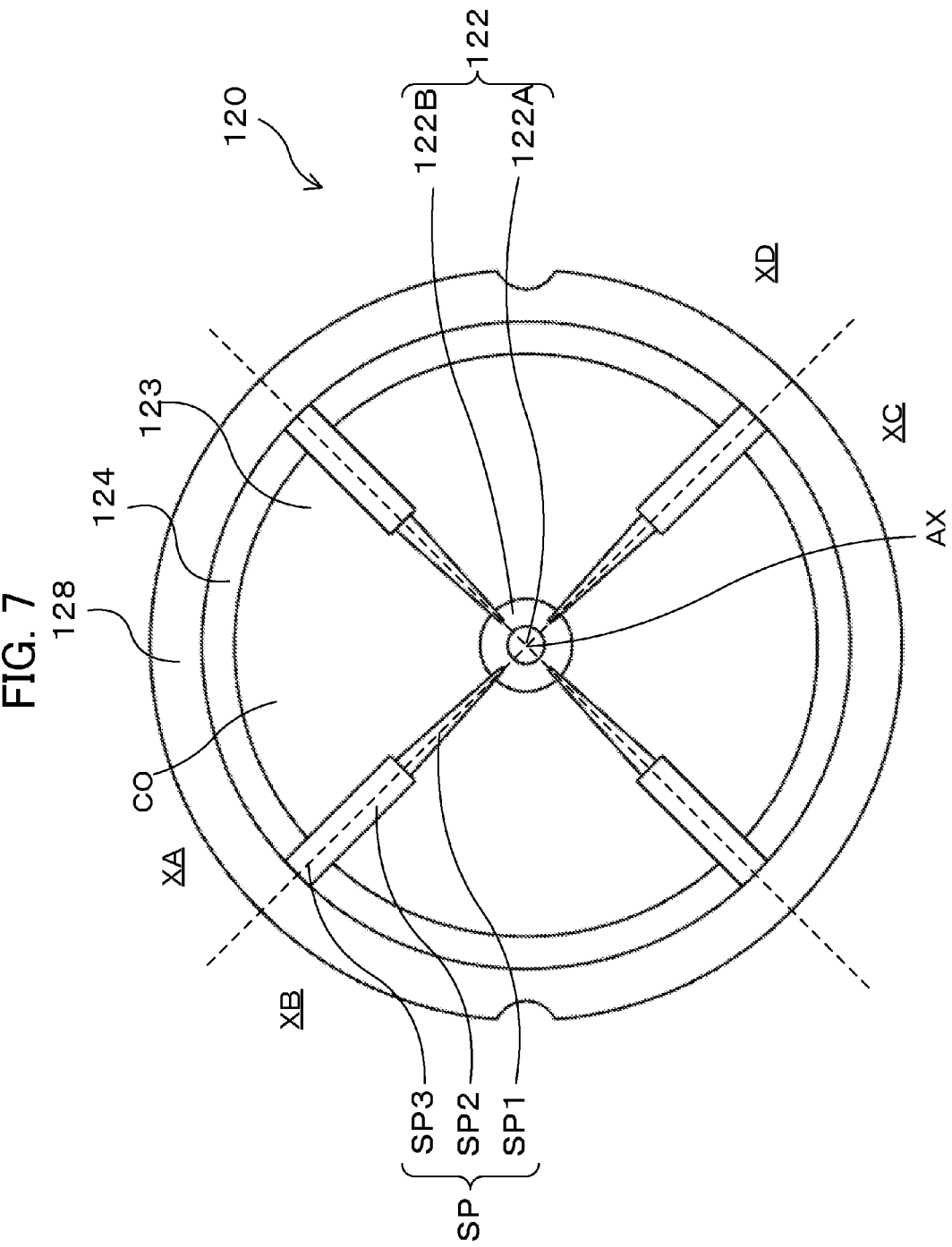
FIG. 7 is a diagram for explaining the configuration of the light guiding unit according to the embodiment.
Figure 8:
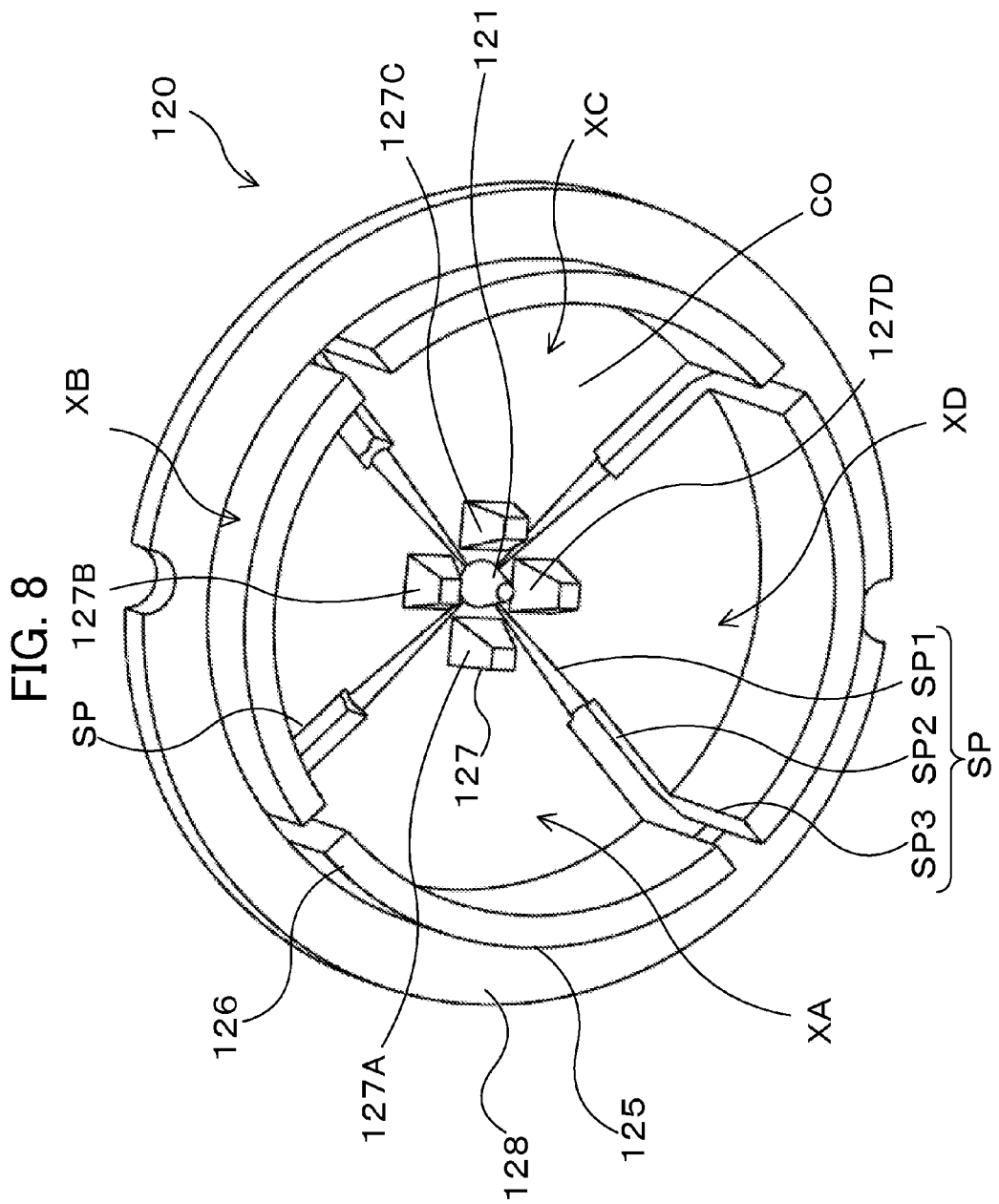
FIG. 8 is a diagram for explaining the configuration of the light guiding unit according to the embodiment.
Figure 9:
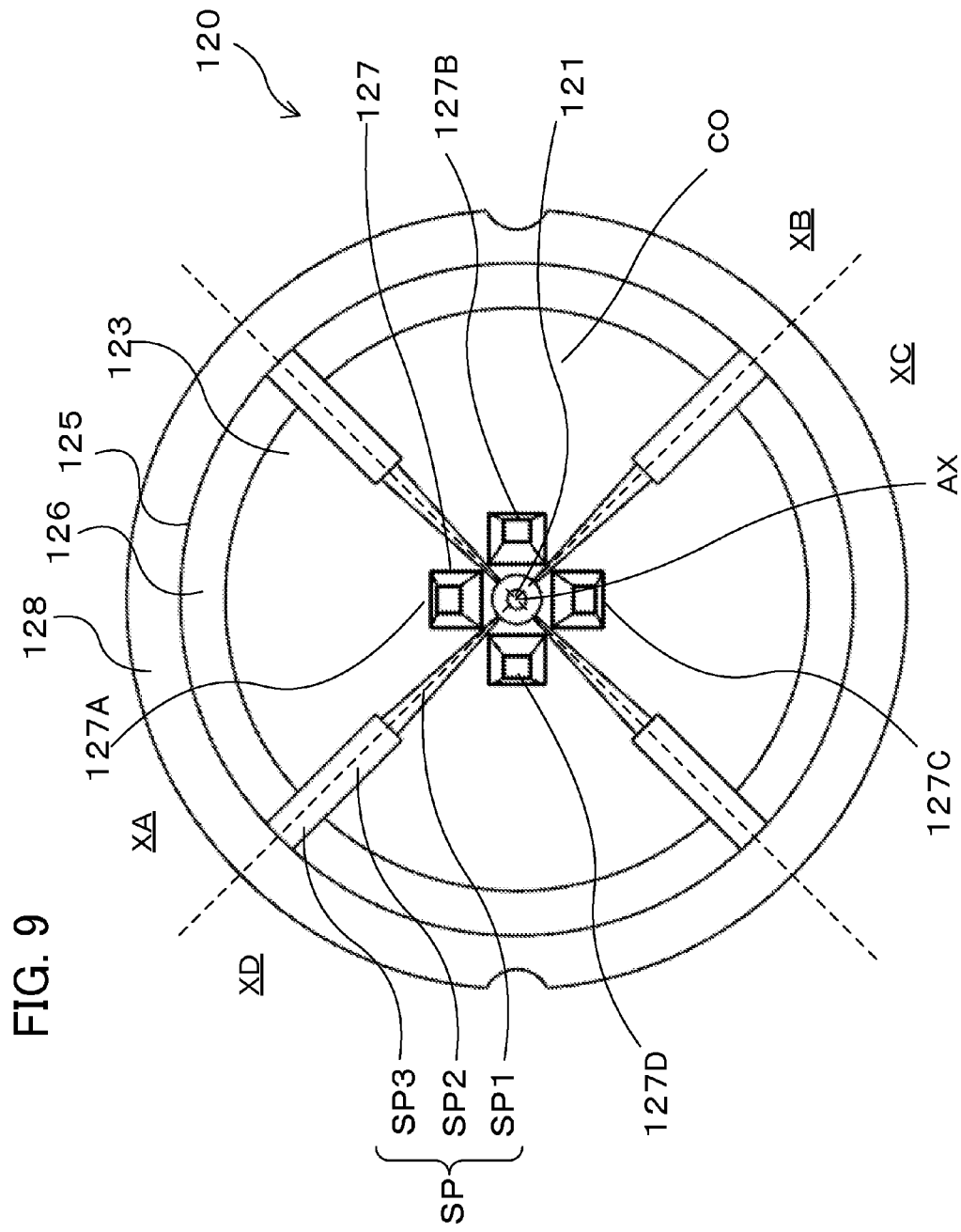
FIG. 9 is a diagram for explaining the configuration of the light guiding unit according to the embodiment.
Figure 10:
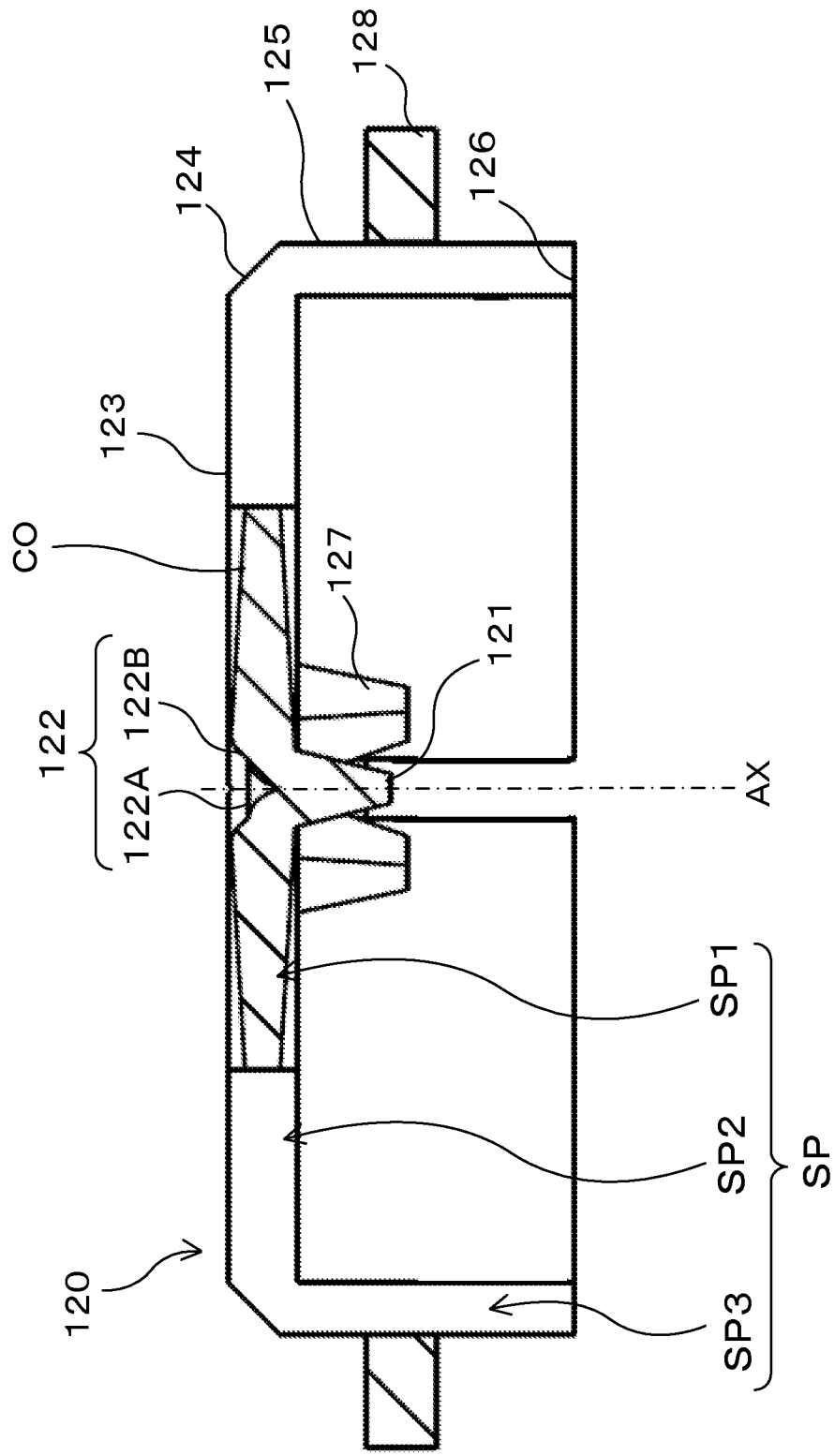
FIG. 10 is a diagram for explaining the configuration of the light guiding unit according to the embodiment.

The configuration and the like of the light guiding unit 120 will be described in more detail with reference to FIG. 3 and FIGS. 6 to 10. FIGS. 6 to 10 are diagrams for explaining the configuration of the light guiding unit according to the embodiment. FIG. 6 is a diagram when the light guiding unit 120 is seen obliquely from above, FIG. 7 is a top view of the light guiding unit 120, FIG. 8 is a diagram when the light guiding unit 120 is seen obliquely from below, and FIG. 9 is a bottom view of the light guiding unit 120. FIG. 10 is a cross section of the light guiding unit 120 taken along line B-B of FIG. 6.

As shown in FIGS. 3, 6, and 8, the light guiding unit 120 has roughly a light incidence unit 121, a light diverging/condensing unit 122, a first light guiding unit 123, a direction converting face 124, a second light guiding unit 125, an irradiation/incidence face 126, a light outgoing part 127, a flange 128, a coating CO, and a light shield SP.

As shown in FIGS. 8 and 9, the light incidence unit 121 is disposed on the rotation axis AX and is formed so as to extend from the first light guiding unit 123 toward the light emitter 111 along the rotation axis AX. Light emitted from the light emitter 111 is incident on the light incidence unit 121, and the light incidence unit 121 guides the light upward. Desirably, the light incidence unit 121 is formed in a columnar shape whose radius increases to the upper side. Light entered from the light incidence unit 121 is directed to a diverging face 122A of the light diverging/condensing unit 122.

The light diverging/condensing unit 122 has a face of an almost circular one shape formed so as to be recessed downward, and is divided into the diverging face 122A and a condensing face 122B in the circumferential direction from the rotation axis AX. The diverging face 122A is formed in a curved face to diverge light propagated from the light incidence unit 121 to the entire circumference of the first light guiding unit 123 while reflecting the light in the radial direction. Desirably, the curved face is set so that parallel light directed from the outside periphery in the radial direction is condensed to the light emitter 111. On the other hand, the condensing face 122B is provided on the outside in the radial direction of the diverging face 122A in the almost circular cone shape of the light diverging/condensing unit 122. The condensing face 122B is formed in a curved face to reflect light, which is propagated through the return path and condensed toward the rotation axis AX in the radial direction in the first light guiding unit 123, toward the light receiver 112. Desirably, the curved face is formed to set the focal point so that parallel light directed from the outside periphery in the radial direction is maximally condensed to the light receiver 112.

As shown in FIG. 3 and FIGS. 6 to 10, the first light guiding unit 123 is formed in an almost disc shape so as to cover the substrate 110, guides light diverged by the diverging face 122A to the outer periphery in the radial direction, and guides light in the return path toward the inner periphery in the radial direction.

As shown in FIGS. 3, 6, and so on, the direction converting face 124 is formed as a ring-shaped face at an angle of about 45 degrees with respect to the radial direction in the outer periphery in the radial direction of the first light guiding unit 123. The direction converting face 124 reflects the light, which propagates through the first light guiding unit 123 in the radial direction, to the lower side. On the other hand, the direction converting face 124 reflects the light, which propagates upward through the second light guiding unit 125, toward the rotation axis AX in the radial direction.

The second light guiding unit 125 is disposed in a ring shape below the ring-shaped direction converting face 124 and is formed to extend from the direction converting face 124 to a vicinity of the mask 130 (fixed rack T1) while covering the sides of the substrate 110. The irradiation/incidence face 126 is formed at the lower side of the second light guiding unit 125. Therefore, the light propagated through the outward path of the light guiding unit 120 is guided by the second guiding unit 125 to the vicinity of the mask 130 and is directed to the mask 130 via the irradiation/incidence face 126. On the other hand, return light from the mask 130 and the like enters the second light guiding unit 125 via the irradiation/incidence face 126 and propagates through the return path by the light guiding unit 120.

As the light outgoing part 127, four light outgoing parts 127A to 127D are disposed in positions corresponding to the light receivers 112A to 112D in the regions XA to XD, respectively, in a vicinity of the light incidence unit 121. The light outgoing parts 127A to 127D guide light propagated through the return path and condensed by the condensing face 122B to a vicinity of the light receivers 112A to 112D and irradiate the light receivers 112A to 112D with the light, respectively.

The flange 128 is formed so as to project from the outer periphery of the second light guiding unit 125 to the outside in the radial direction. The flange 128 plays the role of fixing the light guiding unit 120 to a casing (not shown) of the encoder 100.

The coating CO is disposed on the faces of the light guiding unit 120 other than the irradiation/incidence face 126, the light incidence face of the light incidence unit 121, and the light outgoing face of the light outgoing part 127. The coating CO is made of a material which reflects or blocks light. Therefore, the coating CO can prevent light guided by the light guiding unit 120 from being leaked to the outside and prevent extra light other than irradiation light and return light from being mixed in the light guiding unit 120. The coating CO may not be disposed when the influence of leaked light and stray light is small.

As shown in FIG. 9, the light shields SP are disposed in positions corresponding to the borders of the four regions XA to XD and block light crossing the regions XA to XD. That is, in the case of the embodiment, the light shield SP is disposed in each of the four borders of the four regions XA to XD. By having such light shields SP, the light guiding unit 120 can guide incident light from the regions XA to XD in the mask 130 to the corresponding light receivers 112A to 112D, respectively, so that a noise component in the light reception signal can be reduced.

The light shield SP will be described more specifically.

The light shield SP has, as shown in FIGS. 9 and 10 and so on, a first light shield SP1, a second light shield SP2, and a third light shield SP3 in order from the rotation axis AX. The first light shield SP1 is formed by increasing the width of the light guiding unit 120 (the width in a plane perpendicular to the rotation axis AX) and decreasing the thickness (the thickness in the rotation axis AX) from the rotation axis AX toward the outer periphery in the radial direction. On the other hand, as shown in FIGS. 6, 8, and 10, the second and third light shields SP2 and SP3 are formed as a notch in the light guiding unit 120. The first light shield SP1 has the shape as described above, thereby improving the mechanical strength of the light guiding unit 120 as an integrated unit. Further, by having such a shape, the first light shield SP1 can improve the effect of properly preventing crosstalk of return-path light among the regions XA to XD while preventing diffusion of the outward-path light. The first to third light shields SP1 to SP3 may not be a notch but may be formed of a material which does not transmit light.

The light guiding unit 120 having such a shape can guide the outward light and the return light between the mask 130 and the light emitter 111 or between the light receiver 112 and the mask 130. In the light guiding unit 120, by having the light shield SP, the light crossing the regions XA to XD is reduced, and noise in the light reception signal can be reduced. In the light guiding unit 120, by having the coating CO, reception of leaked light or stray light is prevented, and noise in the light reception signal can be reduced. Since all of the members which guide light can be integrally formed of the same material except for a part of the configuration, the light guiding unit 120 can be easily manufactured by, for example, being molded in a die.

Mask 130

Figure 11:
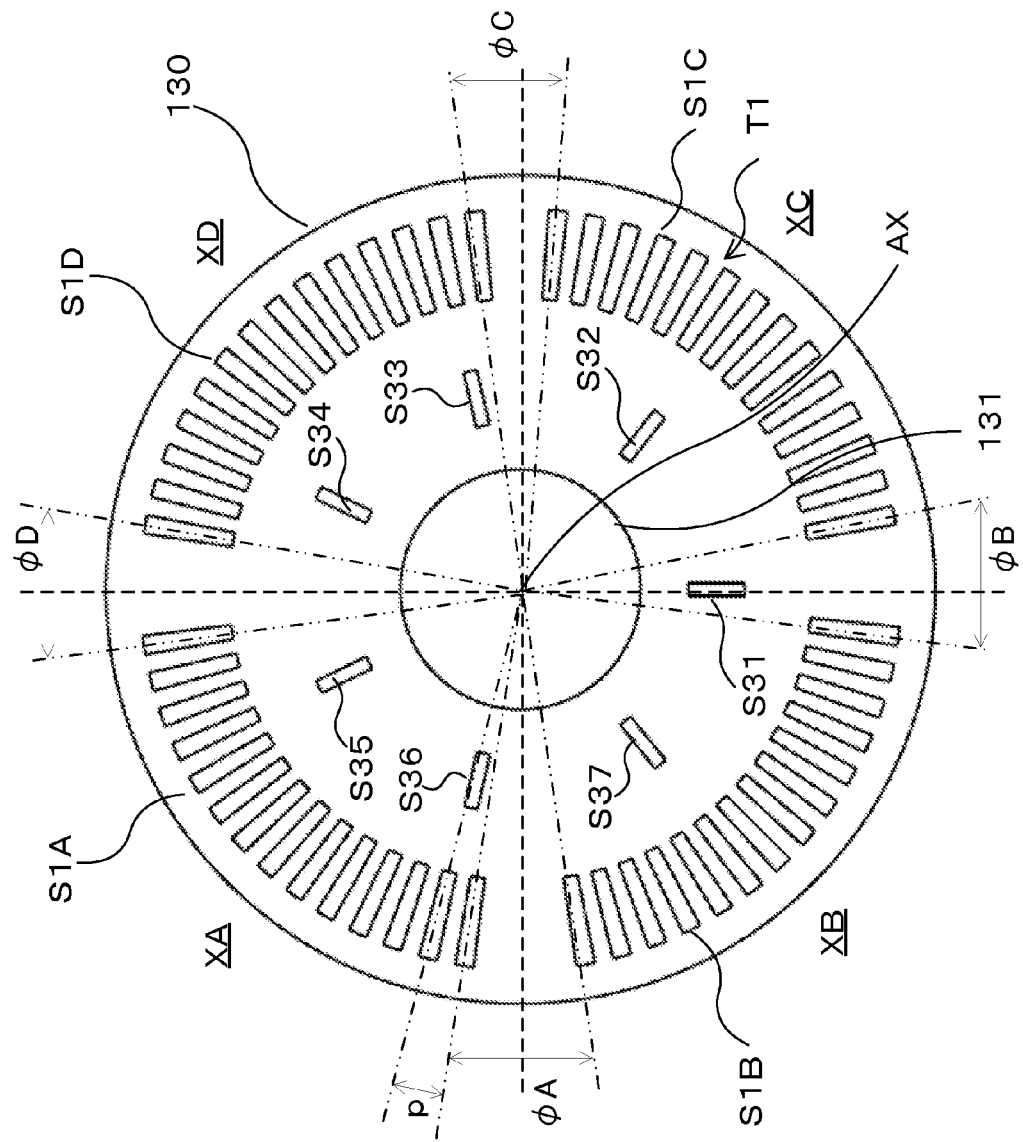
FIG. 11 is a diagram for explaining the configuration of a mask according to the embodiment.

Mainly at least the surface of the mask 130 is made of a material which absorbs or diffuses light, and the mask 130 has a shape covering a top face of the rotation track T2 in the disk 140, and is disposed and fixed in a position where it blocks light directed from the light guiding unit 120. The configuration of the mask 130 is shown in FIG. 11. FIG. 11 is a diagram for explaining the configuration of the mask according to the embodiment. As shown in FIG. 11, the mask 130 has the fixed track T1, fixed slits S3 for absolute encoders (fixed slits S31 to S37 for absolute encoders), and an opening 131.

The fixed track T1 is set in a ring shape using the rotation axis AX as a center above (as an example of one side) the rotation track T2. The fixed track T1 corresponds to the rotation track T2 and has a shape almost matching with that of the rotation track T2. The fixed track T1 is divided in four regions XA to XD in the circumferential direction (rotation direction) as shown in FIG. 11. A plurality of fixed slits S1 are disposed in each of the regions XA to XD.

As shown in FIG. 11, a plurality of fixed slits S1 are formed in radial patterns at equal pitches (repetition intervals) "p" in each of the regions XA to XD around the rotation axis AX as a center. The fixed slits S1 transmit the outward-path light and the return-path light. A plurality of fixed slits S1 included in the regions XA, XB, XC, and XD will be called fixed slits S1A, S1B, S1C, and S1D, respectively. Specifically, light passed through the fixed slits S1A travels in the region XA, light passed through the fixed slits S1B travels in the region XB, light passed through the fixed slits S1C travels in the region XC, and light passed through the fixed slits S1D travels in the region XD.

The plurality of fixed slits S1A will be described as an example more concretely.

The plurality of slits S1A are disposed in the region XA in the track T1. The plurality of fixed slits S1A are disposed radially around the rotation axis AX as a center at equal pitches "p" (for example, angle pitch). The pitches "p" in the fixed slits S1B to S1D are also set equal to the pitch "p" of the fixed slits S1A.

On the other hand, the plurality of fixed slits S1 in one region and the plurality of fixed slits S1 in another region adjacent to the one region are formed so that a phase difference by which the rotation direction can be determined occurs between light reception signals by the light receiver 112. That is, the plurality of fixed slits S1 in one region are formed in predetermined repetition cycle (pitch "p") at an angle about the rotation axis AX, and the fixed slits S1 in another region adjacent to the one region are formed in the same repetition cycles, and yet a phase difference occurs in the cycles. The phase difference is set to a phase difference by which the rotation direction of the disc 140 which will be described later can be determined. A desired value of the phase difference varies according to the number of divisions (four in the embodiment) of the fixed track T1 and resolution of the light reception signal. By setting the phase difference to a value larger than 0 degrees and smaller than 180 degrees, the rotation direction of the disc 140 can be determined. In the case of the embodiment, the regions XA to XD are four equally-divided regions. Consequently, it is desired that the phase difference is set to 90 degrees or 180 degrees. In such a manner, the phase difference between regions can be made the same, and manufacture and signal process is facilitated. In the embodiment, the case where the phase difference between adjacent regions is 90 degrees will be described as an example.

More concretely, the relation between the fixed slits S1A and the fixed slits S1B which are adjacent to each other will be described as an example. A slit interval $\phi A$ (phase difference) is provided between the fixed slit S1A positioned at an end on the fixed slits S1B side in the region XA and the fixed slit S1B positioned at an end on the fixed slits S1A side in the region XB. Since the phase difference is 90° in the embodiment, the slit interval $\phi A$ is set to an odd multiple of the quarter of the pitch "p". Each of other slit intervals $\phi B$ to $\phi D$ is also similarly set to an odd multiple of the quarter of the pitch "p". In the case where the phase difference is 180°, the slit interval $\phi A$ to $\phi D$ is set to an odd multiple of the half of the pitch "p".

The opening 131 is provided in the center position of the mask 130 and releases heat generated by the light emitter 111 and the like in the substrate 110. It is also possible to provide the shaft 202 with a blowing mechanism and send air by the rotation of the blowing mechanism to the substrate 110 via the opening 131, thereby allowing heat to escape from the notch in the light shield SP. In this case, the blowing mechanism may be provided in an opening 190 in the shaft 202.

The fixed slits S31 to S37 for absolute encoders are formed in positions matching with the absolute detectors 1131 to 1137 shown in FIG. 5 in the direction of the rotation axis AX. While the fixed slits S31 to S37 for absolute encoders transmit light emitted from the light emitting elements of the absolute detectors 1131 to 1137 in the direction of the rotation axis AX to irradiate the disk 140, the fixed slits S31 to S37 also transmit light reflected from the disk 140 to the direction of the rotation axis AX and guide the light to the light receiving elements in the absolute detectors 1131 to 1137. At this time, the fixed slits S31 to S37 for absolute encoders collimate the irradiation light and the reflection light to straight light not only to improve precision of light reception signals by the light receiving elements but also to reduce noise in the light reception signals in the light receiver 112.

Disc 140

Figure 12:
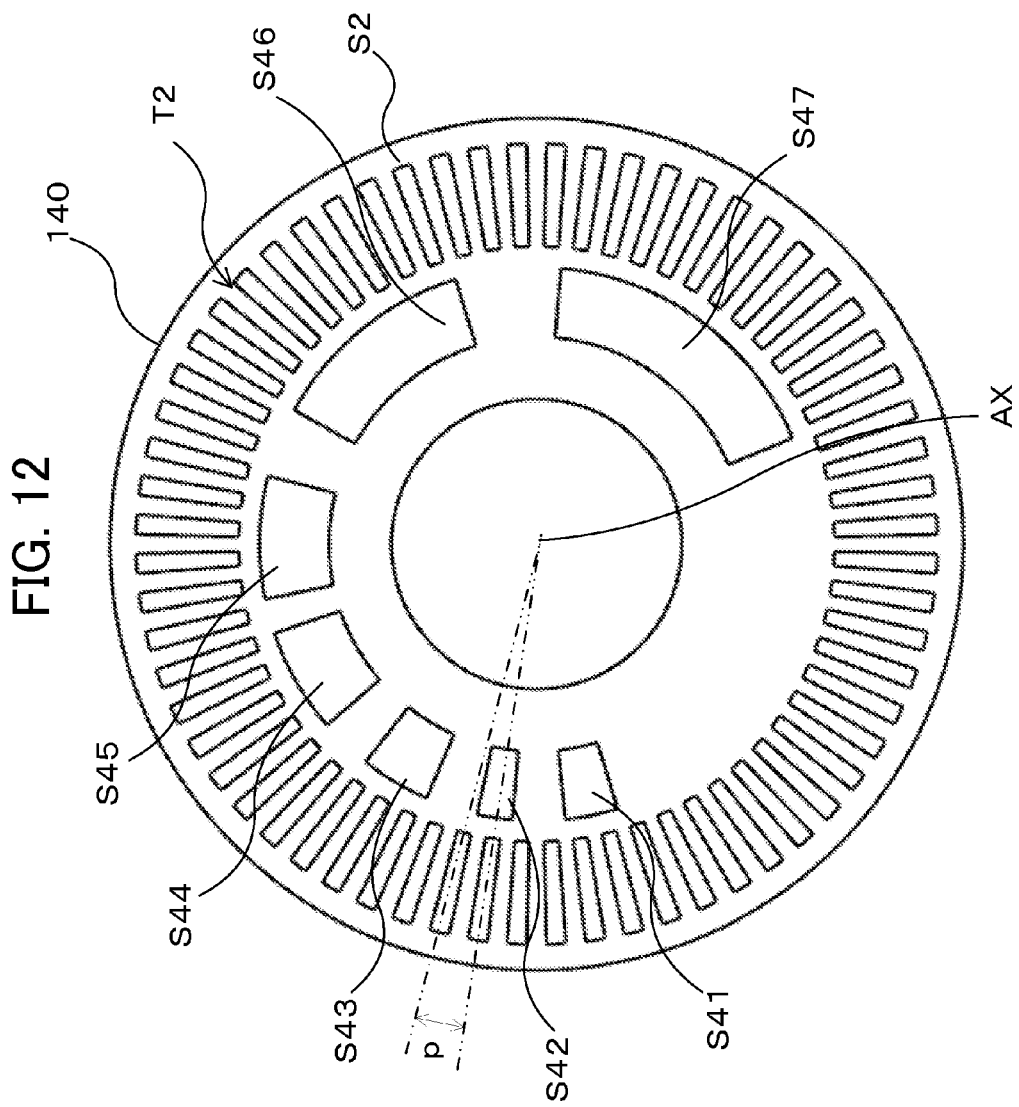
FIG. 12 is a diagram for explaining the configuration of a disk according to the embodiment of the invention.

The disc 140 is fixed to the rotary shaft 202 to which the rotation output of the motor unit 200 is conveyed as shown in FIG. 3. As the configuration of the mask 130, the first light guiding unit 123 in the light guiding unit 120, the substrate 110, and the like, the disc 140 is disposed in parallel to a plane perpendicular to the rotation axis AX. As shown in FIG. 3, the disc 140 has a mask 141 and a light guiding unit 142. The mask 141 has a rotation track T2 and rotation slits S4 for absolute encoders. With reference to FIGS. 3 and 12, the configuration of the disc 140 will be described concretely. FIG. 12 is a diagram for explaining the configuration of the disk according to the second embodiment. FIG. 12 is a diagram viewing a (top) face on the mask 141 side of the disc 140.

As shown in FIG. 12, the disk 140 is formed in a disc shape using the rotation axis AX as a center. The mask 141 is disposed on a top face of the disc 140. The disposing position of the mask 141 is not limited but is desirably disposed on a substrate 110 side rather than reflectors V1 and V2 in the light guiding unit 142.

The mask 141 is formed of, for example, a material which absorbs or diffuses light without transmitting or regular-reflecting light. On the other hand, the track T2 is set in the mask 141, and a plurality of rotation slits S2 transmitting light are disposed in the track T2. Further, the mask 141 also has slits S4 for absolute encoders (rotation slits S41 to S47 for absolute encoders) transmitting light. Those slits transmit light different from the other part of the mask 141.

The fixed track T2 is set in a ring shape using the rotation axis AX as a center below the rotation track T1 in the mask 130 shown in FIG. 11 with almost the same radius. The rotation slits S2 are formed radially around the rotation axis AX as a center at the same pitch "p" as that of the pitches "p" of the fixed slits S1A to S1D. Therefore, when the disc 140 rotates, only the mask 141 in the regions XA to XD in which the fixed slits S1A to S1D shown in FIG. 11 and the rotation slits S2 match with each other in the direction of the rotation axis AX transmits light to the lower side (the light guiding unit 142 side).

The rotation slits S41 to S47 for absolute encoders are formed in positions whose distance from the rotation axis AX is similar to that of the fixed slits S31 to S37 for absolute encoders and that of the absolute detectors 1131 to 1137. The rotation slits S41 to S47 for absolute encoders have a predetermined absolute pattern and transmit light to the lower side when the rotation slits S41 to S47 for absolute encoders and the fixed slits S31 to S37 for absolute encoders match with each other in the rotation axis AX direction. The absolute pattern of the rotation slits S4 for absolute encoders is set so that a combination matching with any of the fixed slits S31 to S37 for absolute encoders in the direction of the rotation axis AX does not become the same in one rotation of the disk 140. That is, the absolute pattern of the rotation slits S4 for absolute encoders is formed so as to show 1X (the absolute position in one rotation) by a combination matching with any of the fixed slits S31 to S37 for absolute encoders in the direction of the rotation axis AX.

As shown in FIG. 3, the light guiding unit 142 has the reflectors V1 and V2 and the coating CO.

The reflectors V1 and V2 are disposed below the rotation slits S2 and the rotation slits S4 for absolute encoders, and reflect light which passed through the rotation slits S2 and the rotation slits S4 for absolute encoders to the upper side so that the light passes through the rotation slits S2 and the rotation slits S4 for absolute encoders again. As shown in FIG. 3, the reflectors V1 and V2 in the embodiment are formed so as to project in a V-shaped ring shape in cross section from the under face of the light guiding unit 142. With the configuration, the reflectors V1 and V2 shift light to the inner side in the radial direction, the light passing through the slits and traveling in an optical path parallel to the rotation axis AX, and reflect the light so that the light travels upward through the optical path parallel to the rotation axis AX. With respect to the return-path light from the reflector V1, the return-path light passes through again the rotation slit S2 and the fixed slit S1, is incident on the light guiding unit 120, and is reflected by the direction converting face 124. As a result, the light passes above the outward light, reaches the condensing face 122B, and is condensed toward the light receiver 112.

The reflectors V1 and V2 are not limited to the above-described configuration as long as they reflect light so as to return it to the slits while shifting the optical path in the radial direction. For example, the reflectors V1 and V2 may be V-shaped trenches provided in a top face of the light guiding unit 142 (in this case, the light guiding unit 142 does not have to transmit light below). By providing the reflectors V1 and V2 as projections below the disc 140, the centrifugal force and mechanical strength of the disc 140 to which a signal is transmitted can be improved.

The configuration of the encoder 100 according to the first embodiment of the invention has been described above. Next, the operation of the encoder 100 according to the first embodiment of the invention will be described. The detailed configuration of the signal processor 114 of the encoder 100 will be described with reference to FIG. 13 in the explanation of the operation. FIG. 13 is a diagram for explaining the configuration of the signal processor according to the embodiment.

1-3 Operation of Encoder According to First Embodiment

As shown in FIG. 13, the signal processor 114 has an A-phase signal generator 1141, a B-phase signal generator 1142, an absolute signal generator 1143, and a position data generator 1144. The components will be described below through the operation.

Absolute Signal Generating Operation

First, the operation of generating the absolute (absolute position) signal (absolute signal) will be described. The absolute signal generating operation is performed by the absolute signal generator 1143 shown in FIG. 13. In the following, description will be given in accordance with the flow of light.

Light emitting elements of the absolute detectors 1131 to 1137 shown in FIGS. 3 and 5 irradiate the mask 130 with light. The light passes through the fixed slits S31 to S37 for absolute encoders of the mask 130 shown in FIG. 11 and is directed to the disc 140 while being collimated. On the other hand, the disc 140 is rotated by the rotation of the motor unit 200, so that the rotation slits S41 to S47 for absolute encoders having a predetermined pattern shown in FIG. 12 also rotate. As a result, light in the rotation slits S41 to S47 for absolute encoders and the fixed slits S31 to S37 for absolute encoders which are matched with each other passes through the rotation slits S41 to S47 for absolute encoders. The transmission light is reflected by the reflector V2 in the light guiding unit 142. The reflected light passes through the rotation slits S41 to S47 for absolute encoders and the fixed slits S31 to S37 for absolute encoders again and is received by light receiving elements of the absolute detectors 1131 to 1137. Therefore, the absolute detectors 1131 to 1137 output light reception signals of a predetermined combination having the cycle in one rotation of the disc 140.

The absolute signal generator 1143 obtains the light reception signal from the absolute detectors 1131 to 1137. From a combination of the seven light reception signals, the absolute signal generator 1143 calculates an almost absolute position in one rotation. In the process of generating an absolute signal expressing the absolute position by the absolute signal generator 1143, various methods such as a method of storing the relation between a combination of seven light reception signals and the absolute position in a table or the like and obtaining the absolute position from the relation can be used. The absolute signal generator 1143 outputs the generated absolute signal to the position data generator 1144.

Operation of Generating A-Phase Signal and B-Phase Signal

Next, the operation of generating an A-phase signal and a B-phase signal corresponding to an incremental signal, which is performed together with the absolute signal generating operation will be described. The A-phase signal and B-phase signal generating operation is performed by the A-phase signal generator 1141 and the B-phase signal generator 1142. In the following, description will be given in accordance with the flow of light.

The light emitter 111 shown in FIGS. 3 and 4 irradiates incidence unit 121 of the light guiding unit 120 with light. Light incident from the light incidence unit 121 propagates upward in the light incidence unit 121, is reflected in the radial direction by the diverging face positioned on the rotation axis AX side of the light diverging/condensing unit 122, and propagates in the first light guiding unit 123 to almost the entire outer circumference in the radial direction. The light is reflected to the lower side (the mask 130 side) by the direction converting face 124, propagates downward through the second light guiding unit 125, and is directed from the irradiation/incidence face 126 to the mask 130. As shown in FIG. 11, the plurality of fixed slits S1A, S1B, S1C, and S1D disposed at the same pitch "p" and each having a 90° phase difference are formed in the regions XA, XB, XC, and XD, respectively, in the disc 140. Therefore, the light directed from the light guiding unit 120 passes through the fixed slits S1A to S1D and is directed to the disc 140 in the pattern of the fixed slits S1A to S1D.

On the other hand, the rotation slits S2 at the equal pitch "p" are formed in the entire circumference of the rotating disc 140 as shown in FIG. 12, the disc 140 transmits light to the lower side only from parts where the fixed slits S1A to S1D and the rotary slits S2 overlap each other in accordance with the position (angle) of the disc 140. Therefore, light whose intensity changes in an almost sine wave shape during rotation of the disc 140 by the amount of one pitch "p" of the fixed slits S2 passes through the fixed slits S2 in the disc 140. On the other hand, the phase difference of 90° or 180° is formed in the fixed slits S1A to S1D between the regions XA to XD, the light passing through the disc 140 in positions corresponding to the regions XA to XD becomes almost-sine-wave-shaped light having the phase difference of 90° or 180°. That is, during rotation of the disc 140 by the amount of one pitch "p", for example, the rotation slits S2 sequentially match with the fixed slit S1A in the region XA, the fixed slit S1B in the region XB, the fixed slit S1C in the region XC, and the fixed slit S1D in the region XD.

The light passed through the disc 140 passes through the light guiding unit 142 formed on the back face of the disc 140 as shown in FIG. 3, is reflected once to the inside in the radial direction by the V-shaped reflector V1 and is reflected again to the upper side (the fixed slit S2 side). The light traveling in the direction opposite to the outward path, in the return path shifted to the inside in the radial direction sequentially passes through the fixed slit S2 and the rotation slit S1 and enters the light guiding unit 120. The light is guided from the irradiation/incidence face which is not applied with the coating CO to the second light guiding unit 125 of the light guiding unit 120 and propagates upward through the second light guiding unit 125 in the direction opposite to the outward path. The light is reflected/condensed by the direction converting face 124 to the inside in the radial direction (that is, the rotation axis AX side). Since the light reflected by the direction converting face 124 passes on the inner side in the radial direction of the outward light before the reflection, the light passes above the outward light (the direction apart from the mask 130) after the reflection. Therefore, different from the outward light, the return light reaches mainly the condensing face 122B of the light diverging/condensing unit 122. On the other hand, since the optical path is set so that light is condensed in a vicinity of the light reception face of the light receiver 112 by the light outgoing part 127, the light reflected by the condensing face 122B propagates through the light outgoing part 127 while being condensed, and is received by the light receiver 112.

As described above, the return light or the like is received by the light receivers 112A, 112B, 112C, and 112D at timings different in the regions XA, XB, XC, and XD by the fixed slits S1A, S1B, S1C, and S1D, respectively, in accordance with the rotation of the disc 140. As shown in FIG. 10, the light guiding unit 120 has the light shields SP capable of preventing crosstalk in light in the regions XA to XD generated at the different timings. As shown in FIGS. 4, 8, and 9, the light outgoing parts 127 and the light receivers 112A, 112B, 112C, and 112D are provided in the regions XA, XB, XC, and XD, respectively. Therefore, in the encoder 100 according the embodiment, the light receivers 112A to 112D generate sine-wave-shaped light reception signals with reduced noise and having a phase difference of 90° or 180° in the regions XA to XD. As shown in FIG. 13, the light reception signals of the light receivers 112A and 112C opposed to each other while sandwiching the rotation axis AX are output to the A-phase signal generator 1141 in the signal processor 114, and the light reception signals of the light receivers 112B and 112D opposed to each other while sandwiching the rotation axis AX are output to the B-phase signal generator 1142 in the signal processor 114.

The A-phase signal generator 1141 and the B-phase signal generator 1142 obtain the two light reception signals received by two light receivers from the two regions having the point-symmetrical relation. Each of the A-phase signal generator 1141 and the B-phase signal generator 1142 performs subtraction (differential) on the two light reception signals, thereby generating one signal. From the A-phase signal generator 1141 and the B-phase signal generator 1142, two signals (A-phase signal and B-phase signal) are generated.

In the case of the embodiment, since the fixed slits S1 in the regions disposed while sandwiching the rotation axis AX has a phase difference of 180°, the two light reception signals obtained by the A-phase signal generator 1141 and the B-phase signal generator 1142 have a phase difference of 180°. Therefore, by performing such differential operation, one A-phase signal or B-phase signal in which an error such as an eccentricity amount is cancelled out is generated from the two light reception signals. For example, in FIG. 11, in the case where the rotation axis AX of the disc 140 is deviated from the desired position to the regions XA and XC, an error caused by the eccentricity occurs in the light reception signals from the regions XA and XC more than the other regions. The intensity of the reception signal from the region XA and that of the reception signal from the region XC having the error are opposite to each other. Therefore, by performing the differential operation on the light reception signals by the A-phase signal generator 1141 like in the embodiment, such an error can be cancelled out. Similarly, the B-phase signal generator 1142 can cancel out an error which occurs in the case where the rotation axis AX of the disc 140 is deviated from the desired position to the regions XB and XD.

Since the fixed slits S1A and S1C have a 90° phase difference in electric angle and the fixed slits S1B and S1D have a 90° phase difference in electric angle, the A-phase signal and the B-phase signal have one cycle by rotation of one pitch "p" of the disc 140 and have a phase difference of 90°.

The A-phase signal generator 1141 and the B-phase signal generator 1142 output the generated A-phase signal and B-phase signal. In this case, the A-phase signal generator 1141 and the B-phase signal generator 1142 may multiply the generated A-phase signal and B-phase signal by a predetermined multiplication number and output the resultant, thereby improving resolution. Preferably, in the process of generating the A-phase signal and the B-phase signal, the A-phase signal generator 1141 and the B-phase signal generator 1142 perform an analog-to-digital converting process and a signal amplifying process.

Since two light reception signals obtained by the A-phase signal generator 1141 and the B-phase signal generator 1142 have a phase difference of 90°, the A-phase signal generator 1141 and the B-phase signal generator 1142 differential-amplify the two light reception signals. For example, in the case where two light reception signals have a phase difference of 180°, the A-phase signal generator 1141 and the B-phase signal generator 1142 can similarly cancel out the error by adding the two light reception signals and amplifying the resultant.

Position Data Generating Operation

Finally, the operation of generating position data from the absolute signal, the A-phase signal, and the B-phase signal will be described. The position data generating operation is performed by the position data generator 1144.

The position data generator 1144 obtains the absolute signal, the A-phase signal, and the B-phase signal generated as described above. Based on those signals, the position data generator 1144 generates position data including the rotation direction of the disc 140. Based on the absolute signal, the position data generator 1144 specifies a rough absolute position in one rotation of the disc 140. On the other hand, the position data generator 1144 specifies an absolute position which is finer than the rough absolute position by, for example, counting at least one of the A-phase signal and the B-phase signal. Further, the position data generator 1144 specifies the rotation direction of the disc 140 by referring to the phase difference of the A-phase signal and the B-phase signal which is 90° or −90°. The position data generator 1144 generates position data including the specified high-precision absolute position and rotation direction and outputs it to the controller 20.

1-4 Example of Effect Produced by First Embodiment

The encoder 100 and the motor system 1 having the encoder 100 according to the first embodiment of the invention have been described above. The encoder 100 and the like irradiates almost the entire circumference of the disc 140 with light and generates light reception signals from signals obtained from the entire circumference. Therefore, the encoder 100 and the like can perform high-precision position detection by reducing the influence of an error caused by eccentricity or the like of the disc 140. Thus, the encoder 100 and the like do not require high-precision positioning of the disc 140 and the like and manufacture of the encoder 100 and the like can be facilitated.

The encoder 100 or the like has the plurality of regions XA to XD in one track T1, thereby enabling light reception signals of different phases to be obtained in the regions XA to XD. Therefore, with the encoder 100 or the like, it is unnecessary to set a plurality of tracks in the disc 140 and the mask 130 and prepare a plurality of light guiding units according to the tracks in order to obtain light reception signals of a plurality of phases for detecting the rotation direction. Therefore, with the encoder 100 and the like, not only decrease in the number of parts and reduction in manufacture cost but also miniaturization of the apparatus itself can be realized. Further, the use amount of the material is consequently reduced, and it is unnecessary to prepare a plurality of light emitters 111, so that the energy consumption amount can be reduced.

In the encoder 100 and the like, the fixed slits S1 are set to obtain light reception signals having phases different by 0° or 180° in electric angle from the regions opposed to each other over the axis. When the phase difference is 180°, two light reception signals obtained from two regions are subjected to subtraction. When the phase difference is 0°, the two light reception signals are subjected to addition. Therefore, with the encoder 100 and the like, the effect of reducing the eccentricity error can be prevented from being decreased. Although the case where the track T1 is divided into four regions has been described in the embodiment, the number of dividing the track T1 is not limited. However, in the case where the number of division is a multiple of four, the A-phase signal or B-phase signal can be generated from regions opposed to each other over the rotation axis AX, and a larger eccentricity and error reducing effect can be displayed. The larger the division number is, the larger the eccentricity error reducing effect can be displayed.

Further, since the encoder 100 and the like is provided with the light shields SP preventing crosstalk of light propagating through the regions XA to XD, noise which occurs in propagation of the light reception signal for the A-phase signal and the light reception signal for the B-phase signal in the same light guiding unit 120 can be reduced. Therefore, the encoder 100 and the like can perform higher-precision position detection.

According to the embodiment of the present invention, while facilitating manufacture, miniaturization can be realized.

Obviously, numerous modifications and variations of the present invention are possible in light of the above teachings. It is therefore to be understood that within the scope of the appended claims, the invention may be practiced otherwise than as specifically described herein.

For example, in the embodiment, slit intervals $\phi A$ to $\phi D$ of 90° in electric angle are provided between the neighboring fixed slits S1A to S1X so that phases of the light reception signals obtained from the neighboring regions $\phi A$ to $\phi D$ become different by 90°. However, the slit intervals $\phi A$ to $\phi D$ are not limited to the example but may be any intervals at which a phase difference of resolution larger than 0° and smaller than 180° in electric angle occurs in a light reception signal.

In the foregoing embodiment, the case where the reflectors V1 and V2 are provided as parts projected from the rear face of the disc 140 has been described. The reflectors V1 and V2 may employ various configurations as long as light of an outward path which passed through the rotary slit S2 can be reflected through an optical path which is the same as or parallel to the outward path. For example, the reflectors V1 and V2 may be formed as V-shaped trenches provided in the rotary slit S2 itself or below the rotary slit S2. In this case, the light guiding unit 142 is not always necessary. In the case of allowing the outward light and the return light to propagate in the same optical path, the rotation slits S2 themselves can be constructed as reflection slits. For example, by partly disposing a high-reflection coating only on the slit openings in 141 in a low-reflection member having a flat plate shape, a structure which does not need 142 can be realized.

In the foregoing embodiment, the light guiding unit 120 has been described as a light guiding member having a plurality of reflection faces and the like. Alternatively, the light guiding unit 120 can be constructed by, for example, an optical fiber capable of emitting light to the entire circumference, a bundle of optical fibers, or the like.

Further, in the foregoing embodiment, the example of providing the configuration for obtaining the absolute signal in order to finally construct the absolute encoder has been described. However, the configuration for the absolute signal is not limited to that in the foregoing embodiment. Various configurations regardless of the optical type, the magnetic type, the resolver type, and the mechanical type can be used. Further, in the case of constructing an incremental encoder, obviously, the configuration of the absolute signal is unnecessary, and disposition of U, V, and W phases and the like can be used for disposition of devices and slits for the absolute signal.

What is claimed as new and is desired to be secured by Letters Patent of the United States is:

1. An optical entire-circumference encoder comprising:
   a rotation track which is rotatable to follow a rotor rotatable around a rotation axis and which is provided to be in a ring shape around the rotation axis as a center;
   a plurality of rotation slits provided to transmit light at an equal pitch radially around the rotation axis as the center in the rotation track;
   a fixed track which is fixedly set in a ring shape in correspondence with the rotation track on one side of the rotation track and which is divided into a plurality of regions in a circumferential direction of the fixed track;
   a plurality of fixed slits provided to transmit light at an equal pitch in the plurality of regions radially around the rotation axis as the center in the fixed track;
   a light source provided to emit light and disposed in a vicinity of the rotation axis;
   a light guide including a first light guide and a second light guide, the first light guide extending outwardly from the vicinity of the rotation axis in a radial direction perpendicular to the rotation axis and being provided to guide light in the radial direction between the light source and the second light guide, the second light guide extending in an axial direction parallel to the rotation axis from an outer periphery of the first light guide toward the plurality of fixed slits provided in the plurality of regions and being provided to guide light in the axial direction between the first light guide and the plurality of fixed slits provided in the plurality of regions, the light guide being provided to guide light emitted from the light source to the plurality of fixed slits provided in the plurality of regions through the first light guide and the second light guide and to guide light which passed through the plurality of fixed slits provided in the plurality of regions and the plurality of rotation slits toward the vicinity of the rotation axis while condensing the light guided by the first light guide and the second light guide; and
   a plurality of light receivers disposed in the vicinity of the rotation axis to receive the light guided by the light guide from the plurality of regions respectively, the plurality of fixed slits in one of the plurality of regions and the plurality of fixed slits in another region adjacent to the one of the plurality of regions in the circumferential direction among the plurality of regions in the fixed track being formed so that a phase difference by which a rotation direction of the rotor is determined occurs between light reception signals generated by the plurality of light receivers based on light guided by the first light guide and the second light guide of the light guide from the plurality of regions of the fixed track.

2. The optical entire-circumference encoder according to claim 1,
   wherein a number of the plurality of regions is an integral multiple of four.

3. The optical entire-circumference encoder according to claim 1,
   wherein the light guide has a plurality of light shields to block light over the plurality of regions, and
   wherein the plurality of light shields are provided to be in positions corresponding to borders of the plurality of regions.

4. The optical entire-circumference encoder according to claim 1,
   wherein the plurality of regions of the fixed track are set rotation-symmetrically of a number of the plurality of regions around the rotation axis, and
   wherein the plurality of fixed slits in each of two regions among the plurality of regions having a point-symmetrical relation with respect to the rotation axis are formed so that a phase difference of 0° or 180° in electric angle occurs between light reception signals of two light receivers among the plurality of light receivers.

5. The optical entire-circumference encoder according to claim 4, further comprising:
   a position data generator configured to generate position data including the rotation direction of the rotor based on a result of performing addition or subtraction on two light reception signals obtained from the two regions having the point-symmetrical relation.

6. The optical entire-circumference encoder according to claim 1, further comprising:
   a substrate including the light source and the plurality of light receivers, the light source being positioned on the rotation axis on a side opposite to the rotation track in the fixed track; and
   a reflector disposed on another side of the rotation track and provided to reflect light which passed through the plurality of fixed slits and, after that, passed through the plurality of rotation slits toward the plurality of rotation slits,
   wherein the light guide is formed to extend from the rotation axis to the fixed track so as to cover the substrate while sandwiching the substrate between the light guide and the fixed track,
   wherein the light guide irradiates the fixed track with light emitted from the light source disposed on the rotation axis, and
   wherein the light guide guides light reflected by the reflector, after that, sequentially passed through the plurality of rotation slits and the plurality of fixed slits to the plurality of light receivers while condensing the light toward the rotation axis.

7. The optical entire-circumference encoder according to claim 1,
   wherein the light guide further includes a direction converting face disposed at the outer periphery of the first light guide, the direction converting face being provided to reflect light guided by the first light guide toward the second light guide and to reflect light guided by the second light guide toward the first light guide.

8. The optical entire-circumference encoder according to claim 7,
wherein the light guide further includes
a light incidence unit which extends from the first light guide toward the light source and on which light emitted from the light source is incident, and
light outgoing parts provided around the light incidence unit and extending from the first light guide toward the plurality of light receivers, respectively, and
wherein the light outgoing parts are provided to respectively guide, to the plurality of light receivers, light guided by the first light guide and the second light guide from the plurality of regions of the fixed track toward the vicinity of the rotation axis.

9. The optical entire-circumference encoder according to claim 1, further comprising:
a reflector disposed on an opposite side of the second light guide relative to the plurality of rotation slits and provided to reflect light which passed through the plurality of fixed slits provided in the plurality of regions and the plurality of rotation slits to the second light guide, the reflector projecting toward an opposite side of the plurality of rotation slits.

10. The optical entire-circumference encoder according to claim 1,
wherein the light guide further includes a plurality of light guiding passages which corresponds to the plurality of region respectively and through which light is to be guided between the light source and the plurality of region, the plurality of light guiding passages being arranged side by side in the circumferential direction, and
wherein each of the plurality of light guiding passages is provided in the first light guide and the second light guide.

11. The optical entire-circumference encoder according to claim 10,
wherein the light guide further includes a plurality of light shields provided between the plurality of light guiding passages in the circumferential direction to block light over the plurality of regions, and
wherein each of the plurality of light shields comprises a notch provided in the first light guide to extend in the radial direction and provided in the second light guide to extending in the axial direction.

12. The optical entire-circumference encoder according to claim 1,
wherein a first fixed slit of the plurality of fixed slits is provided in the one of the plurality of regions,
wherein a second fixed slit of the plurality of fixed slits is provided in the another region among the plurality of region,
wherein the first fixed slit is provided at a circumferential end of the one of the plurality of regions adjacent to the another region in the circumferential direction,
wherein the second fixed slit is provided at a circumferential end of the another region adjacent to the first fixed slit in the circumferential direction, and
wherein a pitch defined between the first fixed slit and the second fixed slit in the circumferential direction is set to an odd multiple of a quarter of the equal pitch of the plurality of fixed slits or to an odd multiple of a half of the equal pitch of the plurality of fixed slits.

13. A motor system comprising:
a motor device configured to rotate a rotary shaft;
an optical entire-circumference encoder coupled to the rotary shaft and configured to measure position of the rotary shaft, the optical entire-circumference encoder comprising:
a rotation track which is rotatable follow the rotor and which is provided to be in a ring shape around the rotation axis as a center;
a plurality of rotation slits provided to transmit light at an equal pitch radially around the rotation axis as the center in the rotation track;
a fixed track which is fixedly set in a ring shape in correspondence with the rotation track on one side of the rotation track and which is divided into a plurality of regions in a circumferential direction of the fixed track;
a plurality of fixed slits provided to transmit light at an equal pitch in the plurality of regions radially around the rotation axis as the center in the fixed track;
a light source provided to emit light and disposed in a vicinity of the rotation axis;
a light guide including a first light guide and a second light guide, the first light guide extending outwardly from the vicinity of the rotation axis in a radial direction perpendicular to the rotation axis and being provided to guide light in the radial direction between the light source and the second light guide, the second light guide extending in an axial direction parallel to the rotation axis from an outer periphery of the first light guide toward the plurality of fixed slits provided in the plurality of regions and being provided to guide light in the axial direction between the first light guide and the plurality of fixed slits provided in the plurality of regions, the light guide being provided to guide light emitted from the light source to the plurality of fixed slits provided in the plurality of regions through the first light guide and the second light guide and to guide light which passed through the plurality of fixed slits provided in the plurality of regions and the plurality of rotation slits toward the vicinity of the rotation axis while condensing the light guided by the first light guide and the second light guide; and
a plurality of light receivers disposed in the vicinity of the rotation axis to receive the light guided by the light guide from the plurality of regions respectively, the plurality of fixed slits in one of the plurality of regions and the plurality of fixed slits in another region adjacent to the one of the plurality of regions in the circumferential direction among the plurality of regions in the fixed track being formed so that a phase difference by which a rotation direction of the rotor is determined occurs between light reception signals generated by the plurality of light receivers based on light guided by the first light guide and the second light guide of the light guide from the plurality of regions of the fixed track; and
a controller configured to control rotation of the motor device based on the position measured by the optical entire-circumference encoder.

14. The optical entire-circumference encoder according to claim 2,
wherein the light guide has a plurality of light shields to block light over the plurality of regions, and
wherein the plurality of light shields are provided to be in positions corresponding to borders of the plurality of regions.

15. The motor system according to claim 13,
wherein the light guide further includes a direction converting face disposed at the outer periphery of the first light guide, the direction converting face being provided to reflect light guided by the first light guide toward the second light guide and to reflect light guided by the second light guide toward the first light guide.

16. The motor system according to claim 15,
wherein the light guide further includes
- a light incidence unit which extends from the first light guide toward the light source and on which light emitted from the light source is incident, and
- light outgoing parts provided around the light incidence unit and extending from the first light guide toward the plurality of light receivers, respectively, and wherein the light outgoing parts are provided to respectively guide, to the plurality of light receivers, light guided by the first light guide and the second light guide from the plurality of regions of the fixed track toward the vicinity of the rotation axis.

17. The motor system according to claim 13, further comprising:
- a reflector disposed on an opposite side of the second light guide relative to the plurality of rotation slits and provided to reflect light which passed through the plurality of fixed slits provided in the plurality of regions and the plurality of rotation slits to the second light guide, the reflector projecting toward an opposite side of the plurality of rotation slits.

18. The motor system according to claim 13,
wherein the light guide further includes a plurality of light guiding passages which corresponds to the plurality of region respectively and through which light is to be guided between the light source and the plurality of region, the plurality of light guiding passages being arranged side by side in the circumferential direction, and wherein each of the plurality of light guiding passages is provided in the first light guide and the second light guide.

19. The motor system according to claim 18,
wherein the light guide further includes a plurality of light shields provided between the plurality of light guiding passages in the circumferential direction to block light over the plurality of light guiding passages, and wherein each of the plurality of light shields comprises a notch provided in the first light guide to extend in the radial direction and provided in the second light guide to extending in the axial direction.

20. The motor system according to claim 13,
wherein a first fixed slit of the plurality of fixed slits is provided in the one of the plurality of regions, wherein a second fixed slit of the plurality of fixed slits is provided in the another region among the plurality of region, wherein the first fixed slit is provided at a circumferential end of the one of the plurality of regions adjacent to the another region in the circumferential direction, wherein the second fixed slit is provided at a circumferential end of the another region adjacent to the first fixed slit in the circumferential direction, and wherein a pitch defined between the first fixed slit and the second fixed slit in the circumferential direction is set to an odd multiple of a quarter of the equal pitch of the plurality of fixed slits or to an odd multiple of a half of the equal pitch of the plurality of fixed slits.

* * * * *